(12) United States Patent
Li et al.

(10) Patent No.: US 11,117,098 B2
(45) Date of Patent: Sep. 14, 2021

(54) MULTIFUNCTIONAL FILTERS FOR DIESEL EMISSION CONTROL

(71) Applicant: BASF Corporation, Florham Park, NJ (US)

(72) Inventors: Yuejin Li, Edison, NJ (US); Stanley A. Roth, Yardley, PA (US)

(73) Assignee: BASF Corporation, Florham Park, NJ (US)

(*) Notice: Subject to any disclaimer, the term of this patent is extended or adjusted under 35 U.S.C. 154(b) by 764 days.

(21) Appl. No.: 15/562,645

(22) PCT Filed: Mar. 30, 2016

(86) PCT No.: PCT/US2016/025007
§ 371 (c)(1),
(2) Date: Sep. 28, 2017

(87) PCT Pub. No.: WO2016/160988
PCT Pub. Date: Oct. 6, 2016

(65) Prior Publication Data
US 2018/0111089 A1    Apr. 26, 2018

Related U.S. Application Data

(60) Provisional application No. 62/140,167, filed on Mar. 30, 2015.

(51) Int. Cl.
*B01D 53/94* (2006.01)
*B01J 23/42* (2006.01)
(Continued)

(52) U.S. Cl.
CPC ....... *B01D 53/9472* (2013.01); *B01D 53/944* (2013.01); *B01D 53/945* (2013.01);
(Continued)

(58) Field of Classification Search
CPC .............. B01D 53/9472; B01D 53/945; B01D 53/9436; B01D 53/944; B01D 53/9418;
(Continued)

(56) References Cited

U.S. PATENT DOCUMENTS

| 8,524,185 B2 | 9/2013 | Caudle et al. |
| 2004/0065078 A1 | 4/2004 | Schafer-Sindlinger et al. |

(Continued)

FOREIGN PATENT DOCUMENTS

| CN | 102985655 A | 3/2013 |
| CN | 103476495 A | 12/2013 |

(Continued)

OTHER PUBLICATIONS

International Preliminary Report on Patentability for counterpart International Patent Application No. PCT/US2016/025007, dated Oct. 3, 2017, 13 pages.

(Continued)

*Primary Examiner* — Anthony J Zimmer
*Assistant Examiner* — Syed T Iqbal
(74) *Attorney, Agent, or Firm* — Finnegan, Henderson, Farabow, Garrett & Dunner LLP

(57) ABSTRACT

Provided are multi-zone catalyst articles, methods of manufacturing multi-zone catalyst articles, and methods for controlling emissions in diesel engine exhaust streams with multi-zone catalyst articles, where the emission treatment system of various embodiments effectively treats diesel engine exhaust with a single multi-zone catalyst article.

18 Claims, 13 Drawing Sheets

(51) Int. Cl.
*B01J 29/76* (2006.01)
*B01J 35/00* (2006.01)
*B01J 35/04* (2006.01)
*B01J 35/10* (2006.01)
*B01J 37/02* (2006.01)
*B01D 46/24* (2006.01)
*F01N 3/035* (2006.01)
*F01N 3/20* (2006.01)

(52) U.S. Cl.
CPC ..... *B01D 53/9418* (2013.01); *B01D 53/9436* (2013.01); *B01D 53/9468* (2013.01); *B01J 23/42* (2013.01); *B01J 29/763* (2013.01); *B01J 35/0006* (2013.01); *B01J 35/04* (2013.01); *B01J 35/1076* (2013.01); *B01J 37/024* (2013.01); *B01D 53/9477* (2013.01); *B01D 2046/2433* (2013.01); *B01D 2046/2437* (2013.01); *B01D 2255/1021* (2013.01); *B01D 2255/2092* (2013.01); *B01D 2255/20761* (2013.01); *B01D 2255/30* (2013.01); *B01D 2255/50* (2013.01); *B01D 2255/902* (2013.01); *B01D 2255/903* (2013.01); *B01D 2255/9022* (2013.01); *B01D 2255/9025* (2013.01); *B01D 2255/9032* (2013.01); *B01D 2255/9035* (2013.01); *B01D 2255/9037* (2013.01); *B01D 2255/9155* (2013.01); *B01D 2258/012* (2013.01); *F01N 3/035* (2013.01); *F01N 3/2066* (2013.01); *F01N 2370/04* (2013.01); *Y02T 10/12* (2013.01)

(58) Field of Classification Search
CPC ........ B01D 53/9468; B01D 2255/9032; B01D 2258/012; B01D 53/9477; B01D 2255/902; B01D 2046/2437; B01D 2255/2092; B01D 2255/30; B01D 2255/903; B01D 2046/2433; B01D 2255/9155; B01D 2255/1021; B01D 2255/20761; B01D 2255/50; B01D 2255/9022; B01D 2255/9025; B01D 2255/9035; B01D 2255/9037; B01J 23/42; B01J 29/763; B01J 35/0006; B01J 35/04; B01J 35/1076; B01J 37/024; Y02T 10/24; Y02T 10/22; F01N 3/035; F01N 3/2066; F01N 2370/04
See application file for complete search history.

(56) References Cited

U.S. PATENT DOCUMENTS

| | | |
|---|---|---|
| 2009/0272101 A1 | 11/2009 | Wills et al. |
| 2010/0058746 A1 | 3/2010 | Pfeifer et al. |
| 2010/0239478 A1 | 9/2010 | Arnold et al. |
| 2011/0123421 A1 | 5/2011 | Grubert |
| 2011/0229391 A1 | 9/2011 | Paulus et al. |
| 2011/0271664 A1* | 11/2011 | Boorse ............... B01D 53/9468 60/301 |
| 2011/0274601 A1* | 11/2011 | Boorse ............... B01D 53/9431 423/213.2 |
| 2012/0014842 A1 | 1/2012 | Dornhaus et al. |
| 2012/0247092 A1 | 10/2012 | Boorse |
| 2012/0288427 A1* | 11/2012 | Grubert ............... B01D 53/944 423/213.2 |
| 2013/0149220 A1 | 6/2013 | Swallow et al. |
| 2014/0093442 A1 | 4/2014 | Spreitzer et al. |
| 2014/0161679 A1 | 6/2014 | Chiffey et al. |
| 2016/0045868 A1 | 2/2016 | Sonntag et al. |

FOREIGN PATENT DOCUMENTS

| | | |
|---|---|---|
| CN | 103687661 A | 3/2014 |
| EP | 1961933 A1 | 8/2008 |
| GB | 2492175 | 12/2012 |
| WO | WO 2011/041769 | 4/2011 |
| WO | WO 2011/140251 | 11/2011 |
| WO | WO 2012/135871 | 10/2012 |
| WO | WO 2014072717 A1 | 5/2014 |
| WO | WO 2016024126 A1 | 2/2016 |

OTHER PUBLICATIONS

International Search Report for counterpart International Patent Application No. PCT/US2016/025007, dated Jul. 14, 2016, 2 pages.
Supplementary European Search Report for counterpart European Patent Application No. 16 77 4106, dated Nov. 13, 2018, 3 pages.

* cited by examiner

MULTIFUNCTIONAL FILTERS FOR DIESEL EMISSION CONTROL

CROSS-REFERENCE TO RELATED APPLICATIONS

The present application is a U.S. National Stage of International Patent Application PCT/US2016/025007, filed Mar. 30, 2016 and claims priority to U.S. Provisional Patent Application No. 62/140,167, filed Mar. 30, 2015. The disclosures of each of the applications noted above are incorporated herein by reference in their entirety.

TECHNICAL FIELD OF THE INVENTION

The present invention relates to catalyst articles, emission treatment systems, and methods of treating exhaust gas. Provided are multi-zone catalyst articles, methods of manufacturing multi-zone catalyst articles, and methods for controlling emissions in diesel engine exhaust streams with multi-zone catalyst articles, where the emission treatment system of various embodiments effectively treats diesel engine exhaust with a single multi-zone catalyst article.

BACKGROUND OF THE INVENTION

Engine exhaust and in particular, diesel engine exhaust, is a heterogeneous mixture which contains not only gaseous emissions such as carbon monoxide ("CO"), unburned hydrocarbons ("HC"), and nitrogen oxides ("$NO_x$"), but also condensed phase materials (liquids and solids), commonly referred to as particulates or particulate matter (PM). Regulated species of exhaust emissions include CO, HC, $NO_x$, and PM.

Often, catalyst compositions and substrates on which the compositions are disposed are provided in diesel engine exhaust systems to convert certain or all of these exhaust components to innocuous components. For example, diesel exhaust systems can contain one or more of a diesel oxidation catalyst, a soot filter and a catalyst for the reduction of NOx.

Oxidation catalysts that contain platinum group metals, base metals, and combinations thereof are known to facilitate the treatment of diesel engine exhaust by promoting the conversion of both HC and CO gaseous pollutants and some proportion of the particulate matter through oxidation of these pollutants to carbon dioxide and water. Such catalysts have generally been contained in units called diesel oxidation catalysts (DOCs), which are placed in the exhaust of diesel engines to treat the exhaust before it vents to the atmosphere. In addition to the conversion of gaseous HC, CO and particulate matter, oxidation catalysts that contain platinum group metals (which are typically dispersed on a refractory oxide support) also promote the oxidation of nitric oxide (NO) to $NO_2$.

The total particulate matter (TPM) emissions of diesel exhaust are comprised of three main components. One component is the dry, solid carbonaceous fraction or soot fraction. This dry carbonaceous matter contributes to the visible soot emissions commonly associated with diesel exhaust. A second component of the particulate matter is the soluble organic fraction ("SOF"). The soluble organic fraction is sometimes referred to as the volatile organic fraction ("VOF"), which terminology will be used herein. The VOF can exist in diesel exhaust either as a vapor or as an aerosol (fine droplets of liquid condensate) depending on the temperature of the diesel exhaust. It is generally present as condensed liquids at the standard particulate collection temperature of 52° C., in diluted exhaust, as prescribed by a standard measurement test, such as the U.S. Heavy Duty Transient Federal Test Procedure. These liquids arise from two sources: (1) lubricating oil swept from the cylinder walls of the engine each time the pistons go up and down; and (2) unburned or partially burned diesel fuel. The third component of the particulate matter is the so-called sulfate fraction. The sulfate fraction is formed from small quantities of sulfur components present in the diesel fuel and lubricating oil. During combustion, the sulfur components of the diesel fuel and oil form gaseous $SO_2$ and $SO_3$. As the exhaust cools, $SO_3$ combines rapidly with water to form sulfuric acid, $H_2SO_4$. The sulfuric acid forms an aerosol that collects as a condensed phase with the carbon particulates, or is adsorbed onto the other particulate components, and thereby adds to the mass of TPM.

One key after-treatment technology in use for high particulate matter reduction is the diesel particulate filter (DPF). There are many known filter structures that are effective in removing particulate matter from diesel exhaust, such as honeycomb wall flow filters, wound or packed fiber filters, open cell foams, sintered metal filters, etc. However, ceramic wall flow filters, described below, receive the most attention. These filters are capable of removing over 90% of the solid carbonaceous particulate material from diesel exhaust. The filter is a physical structure for removing particles from exhaust, and the accumulating particles will increase the back pressure from the filter on the engine. Thus the accumulating particles have to be continuously or periodically burned out of the filter to maintain an acceptable back pressure. Unfortunately, the carbon soot particles require temperatures in excess of 500° C. to burn under oxygen rich (lean) exhaust conditions. This temperature is higher than that typically present in diesel exhaust.

Provisions are generally introduced to increase exhaust temperature in order to provide for active regeneration of the filter. The presence of a catalyst provides for CO, HC and NO oxidation within the filter and an increase in the rate of soot combustion. In this way a catalyzed soot filter (CSF) or catalyzed diesel particulate filter (CDPF) is effective in providing for >90% particulate matter reduction along with active burning of the accumulating soot.

Another mechanism for the removal of particles is through the use of $NO_2$ in the exhaust stream as an oxidant. Thus, particulates may be removed by oxidation employing $NO_2$ as an oxidant at temperatures above 300° C. The $NO_2$ already in the exhaust from the engine may additionally be supplemented through oxidation of NO (also in the exhaust) through the use of an upstream DOC oxidation catalyst. This passive regeneration mechanism can further reduce the soot load in a filter and decrease the number of active regeneration cycles.

Future emissions standards adopted throughout the world will also address NOx reductions from diesel exhaust. A proven NOx abatement technology applied in heavy-duty mobile emission systems since 2006 in Europe and since 2010 in US with lean diesel exhaust conditions is Selective Catalytic Reduction (SCR). In this process, NOx is reduced with ammonia ($NH_3$) to nitrogen ($N_2$) over a catalyst typically composed of base metals. The technology is capable of NOx reduction greater than 90%, and thus it represents one of the best approaches for achieving aggressive NOx reduction goals. SCR for mobile applications uses urea (typically present in an aqueous solution) as the source of ammonia.

SCR provides efficient conversions of NOx as long as the exhaust temperature is within the active temperature range of the catalyst.

While separate substrates, each containing catalysts to address discrete components of the exhaust, can be provided in an exhaust system, use of fewer substrates is desirable to reduce the overall size of the system, to ease the assembly of the system, and to reduce the overall cost of the system. One approach to achieve this goal is to coat the soot filter with a catalyst composition effective for the conversion of NOx to innocuous components (giving an "SCR-catalyzed soot filter" or "coated soot filter"). With this approach, the SCR-catalyzed soot filter assumes two catalyst functions: removal of the particulate component of the exhaust stream and conversion of the NOx component of the exhaust stream to $N_2$.

Coated soot filters that can achieve NOx reduction goals require a sufficient loading of SCR catalyst composition on the soot filter. The gradual loss of the catalytic effectiveness of the compositions that occurs over time through exposure to certain deleterious components of the exhaust stream augments the need for higher catalyst loadings of the SCR catalyst composition. However, preparation of coated soot filters with higher catalyst loadings can lead to unacceptably high back pressure within the exhaust system. Coating techniques that allow higher catalyst loadings on the wall flow filter, yet still allow the filter to maintain flow characteristics that achieve acceptable back pressures are therefore desirable.

An additional aspect for consideration in coating the wall flow filter is the selection of the appropriate SCR catalyst composition. First, the catalyst composition must be durable so that it maintains its SCR catalytic activity even after prolonged exposure to higher temperatures that are characteristic of filter regeneration. For example, combustion of the soot fraction of the particulate matter often leads to temperatures above 700° C. Such temperatures render many commonly used SCR catalyst compositions such as mixed oxides of vanadium and titanium less catalytically effective. Second, the SCR catalyst compositions preferably have a wide enough operating temperature range so that they can accommodate the variable temperature ranges over which the vehicle operates. Temperatures below 300° C. are typically encountered, for example, at conditions of low load, or at engine startup. The SCR catalyst compositions are preferably capable of catalyzing the reduction of the NOx component of the exhaust to achieve NOx reduction goals, even at lower exhaust temperatures.

There remains a need in the art for catalyst articles, methods and systems to treat the carbon monoxide, nitrogen oxides, hydrocarbons and particulate matter from a diesel engine in an effective and inexpensive manner while simultaneously minimizing required space in the exhaust system.

SUMMARY OF THE INVENTION

Various embodiments are listed below. It will be understood that the embodiments listed below may be combined not only as listed below, but in other suitable combinations in accordance with the scope of the invention.

Embodiments of the invention are directed to five-way and even six-way catalysts for diesel exhaust emission control. As the name implies, in such five-way and six-way catalysts, all five/six of the main emissions in the exhaust (CO, HC, NOx, soot, $NH_3$ and $H_2S$) are removed by a single catalytic article. A problem that is faced is how to balance several competing reactions to provide an overall reduction in the pollution components of an exhaust gas stream.

One or more embodiments described herein relate to a catalyzed particulate filter comprising a plurality of porous walls extending longitudinally to form a plurality of parallel passages extending from an inlet end to an outlet end, wherein a quantity of the passages are inlet passages that are open at the inlet end and closed at the outlet end, and a quantity of passages are outlet passages that are closed at the inlet end and open at the outlet end, a first coating permeating through at least a portion of the porous walls of the particulate filter, wherein the length of porous wall permeated with the first coating is in the range of about 1% to about 80% of the wall length extending from the outlet end of the passages, and wherein the first coating is an oxidation catalyst comprising a platinum group metal; and a second coating permeating through at least a portion of the porous walls of the particulate filter, wherein the length of porous wall permeated with the second coating is in the range of about 50% to about 100% of the wall length extending from the inlet end of the passages, and wherein the second coating comprises a first selective catalytic reduction catalyst.

In some embodiments, the first selective catalytic reduction catalyst is a zeolitic framework material promoted with a metal selected from Cu, Fe, Co, Ni, La, Ce, Mn, V, Ag, and combinations thereof.

In some embodiments, the second coating permeates the porous walls of the particulate filter over essentially the entire length (e.g., about 90-100% the entire length) of the porous walls of the particulate filter, and the first coating is intermingled with the second coating over about 1% to about 80% of the wall length extending from the outlet end of the passages.

In certain embodiments, the first selective catalytic reduction catalyst comprises a molecular sieve promoted with a base metal, and wherein the length of the porous walls permeated only with the second coating forms a first catalytic zone, and the length of the porous walls permeated with both the first coating and second coating forms a second catalytic zone, wherein the oxidation catalyst intermingles with the first selective catalytic reduction catalyst in the second catalytic zone. In some embodiments, the platinum group metal loading in the second catalytic zone is in the range of about 0.1 g/ft$^3$ to about 50 g/ft$^3$.

In some embodiments, the length of porous wall permeated with the second coating is in the range of about 50% to about 80% of the wall length extending from the inlet end of the passages; wherein the length of porous wall that is permeated with the first coating but not permeated with the second coating is in the range of about 20% to about 50% of the wall length extending from the outlet end of the passages; and wherein the length of porous wall permeated with the second coating and having an overlapping first coating is in the range of about 5% to about 60% of the wall length, where the first coating is coated onto the surface of the overlapping portion of the porous wall permeated with the second coating. Such catalyzed particulate filters can, in some embodiments, further comprise a third coating that permeates through a portion of the porous walls of the particulate filter in the range of about 20% to about 80% of the wall length from the outlet end, wherein the third coating comprises a second selective reduction catalyst; wherein the length of the porous walls permeated only with the second coating forms a first catalytic zone of a first SCR catalyst, the length of the porous walls permeated with the second coating and coated on the surface with the first coating forms a second catalytic zone of the first SCR catalyst and AMOx catalyst, and the length of the porous walls permeated with both the first coating and third coating forms a third catalytic zone of the second SCR catalyst and AMOx catalyst.

In some embodiments, filters described herein can further comprise a third coating that permeates through a portion of the porous walls of the particulate filter in the range of about 20% to about 80% of the wall length from the outlet end, wherein the third coating comprises a second selective reduction catalyst; wherein the length of the porous walls permeated only with the second coating forms a first catalytic zone of a first SCR catalyst, the length of the porous walls permeated with the second coating and the third coating forms a second catalytic zone of the first SCR catalyst and the second SCR catalyst, and the length of the porous walls permeated with both the first coating and third coating forms a third catalytic zone of the second SCR catalyst and AMOx catalyst.

In certain embodiments, the length of porous wall permeated with the second coating is in the range of about 95% to about 100% of the wall length extending from the inlet end of the passages; wherein the length of porous wall that is permeated with the first coating but not permeated with the second coating is in the range of about 0% to about 5% of the wall length extending from the outlet end of the passages; wherein the length of porous wall permeated with the second coating and having an overlapping first coating is in the range of about 5% to about 75% of the wall length, where the first coating is coated onto the surface of the overlapping portion of the porous wall permeated with the second coating; and which further comprises a third coating that permeates through the portion of the porous walls of the particulate filter not permeated with the second coating, wherein the third coating comprises a second selective reduction catalyst, and the third coating is coated onto the surface of the overlapping portion of the porous wall permeated with the second coating. The length of the porous wall coated on the surface with the first coating and the third coating can, in certain such embodiments, be about the same. In certain embodiments, the catalyzed particulate filter further comprises a plug coating on the outlet side of the closed outlet end of the inlet passages, wherein the plug coating comprises a platinum group metal.

In some embodiments, the porosity of the porous walls is in the range of about 40% to about 75%, and the mean pore size of the porous walls is in the range of about 10 µm to about 30 µm; and the first selective catalytic reduction catalyst comprises a copper or iron promoted CHA structure type molecular sieve.

In certain embodiments, a catalyzed particulate filter is provided which further comprises a third coating that permeates through the portion of the porous walls of the particulate filter in the range of about 20% to about 80% of the wall length from the outlet end; wherein the third coating comprises a second selective reduction catalyst; and wherein the length of the porous walls permeated only with the second coating forms a first catalytic zone of a first SCR catalyst, the length of the porous walls permeated with the second coating and the first coating forms a second catalytic zone of the first SCR catalyst and AMOx catalyst, and the length of the porous walls permeated with both the first coating and third coating forms a third catalytic zone of a second SCR catalyst and AMOx catalyst. The third coating in such embodiments may, for example, comprise a copper or iron promoted CHA structure type molecular sieve. In certain embodiments, the length of porous wall permeated with the second coating is in the range of about 95% to about 100% of the wall length extending from the inlet end of the passages, the length of porous wall coated on the surface with the first coating is in the range of about 5% to about 50% of the wall length, and the third coating permeated through the portion of the porous walls of the particulate filter not permeated with the second coating and coated onto the surface of the porous wall in the range of about 1% to about 70% of the wall length, wherein at least a portion of the first coating on the surface of the porous wall is sandwiched between the second coating and a portion of the third coating.

In another aspect, a method of manufacturing a coated particulate filter is provided, comprising: introducing an oxidation catalyst comprising a plurality of particles into an outlet end of a plurality of parallel passages formed by a plurality of porous walls closed by a plug on an inlet end opposite the outlet end, wherein the particles of the oxidation catalyst permeates through at least a portion of the porous walls, and wherein the length of porous wall permeated with the oxidation catalyst is in the range of about 1% to about 80% of the wall length extending from the outlet end of the passages; and introducing a first selective catalytic reduction catalyst comprising a plurality of particles into an inlet end of a plurality of parallel passages formed by a plurality of porous walls closed by a plug on an outlet side opposite the inlet side, wherein the particles of the first selective catalytic reduction catalyst permeates through the porous walls, and wherein the length of porous wall permeated with the particles of the first selective catalytic reduction catalyst is in the range of about 50% to about 100% of the wall length extending from the inlet end of the passages.

In certain embodiments, the porosity of the porous walls is in the range of about 40% to about 70%, and the mean pore size of the porous walls is in the range of about 10 µm to about 30 µm; wherein the oxidation catalyst further comprises at least one platinum group metal on the plurality of particles, and the plurality of particles of the oxidation catalyst have a composition of alumina, titania, zirconia, silica, silica/alumina, or a combination thereof; and wherein the first selective catalytic reduction catalyst is a molecular sieve promoted with a metal selected from Cu, Fe, Co, Ni, La, V, Mo, W, Mn, Ce, Ag and combinations thereof.

In some embodiments, the first selective catalytic reduction catalyst is introduced into the inlet end of the plurality of parallel passages before the oxidation catalyst is introduced into the outlet end of the plurality of parallel passages, and the length of porous wall permeated with the first selective catalytic reduction catalyst is in the range of about 50% to about 80% of the wall length extending from the inlet end of the passages, the length of porous wall that is not permeated with the first selective catalytic reduction catalyst, but permeated with the oxidative catalyst, is in the range of about 20% to about 50% of the wall length extending from the outlet end of the passages, and the length of porous wall permeated with the first selective catalytic reduction catalyst and having an overlapping oxidation catalyst is in the range of about 5% to about 50% of the wall length, wherein the oxidation catalyst remains essentially on the surface of the overlapping portion of the porous wall without interspersing with the first selective catalytic reduction catalyst throughout the porous wall.

The method, in some embodiment, further comprises introducing a second selective catalytic reduction catalyst comprising a plurality of particles comprising a copper or iron promoted CHA structure type molecular sieve into the outlet end of the plurality of parallel passages, wherein the second selective catalytic reduction catalyst permeates through the portion of the porous walls of the particulate filter not previously permeated with the first selective catalytic reduction catalyst, and wherein the first selective catalytic reduction catalysts comprises a copper or iron promoted CHA structure type molecular sieve.

In certain embodiments, the length of porous wall permeated with the particles of the first selective catalytic reduction catalyst is in the range of about 95% to about 100% of the wall length extending from the inlet end of the passages, the length of porous wall coated on the surface with the particles of the oxidation catalyst is in the range of about 1% to about 80% of the wall length extending from the outlet end of the passages, and the second selective catalytic reduction catalyst is coated onto the porous walls in the range of about 1% to about 80% of the wall length extending from the outlet end of the passages, wherein the second selective catalytic reduction catalyst is coated onto the surfaces of the porous walls where the second selective catalytic reduction overlaps with the first selective catalytic reduction catalyst.

The method, in some embodiments, further comprises coating a platinum group metal onto the filter such that it only covers the plug at the end of the outlet passages. In certain embodiments, the method further comprises impregnating the platinum group metal into the plurality of the alumina, Mania, zirconia, silica, silica/alumina, or a combination thereof particles by an incipient wetness technique followed by thermally treating the impregnated particles at a temperature of about 400° C. to about 600° C., wherein the loading of platinum group metal onto the length of porous wall permeated with the oxidation catalyst is in the range of about 0.1 g/ft$^3$ to about 50 g/ft$^3$. In some such embodiments, a copper or iron promoted CHA structure type molecular sieve is mixed with the plurality of platinum group metal impregnated particles to form a slurry, and the length of porous wall permeated with the slurry is in the range of about 10% to about 50% of the wall length extending from the outlet end of the passages.

One or more embodiments relate to a method of abating exhaust gas from a lean burn diesel engine, comprising flowing an exhaust gas through any embodiment of the catalyzed particulate filters disclosed herein, wherein at least five of CO, HC, NO$_x$, soot, NH$_3$ and H$_2$S are at least partially removed from the exhaust gas by the catalyzed particulate filter.

BRIEF DESCRIPTION OF THE DRAWINGS

Further features of embodiment of the present invention, their nature and various advantages will become more apparent upon consideration of the following detailed description, taken in conjunction with the accompanying drawings, which are also illustrative of the best mode contemplated by the applicants, and in which like reference characters refer to like parts throughout, where.

DETAILED DESCRIPTION OF THE INVENTION

Figure 1:
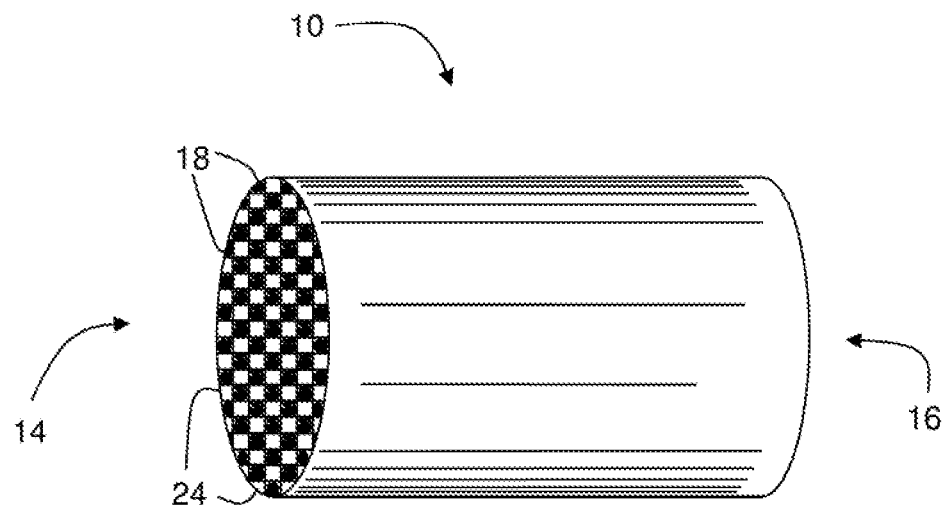
FIG. 1 illustrates an external view of an embodiment of a wall flow filter substrate having an inlet end and an outlet end.

Before describing several exemplary embodiments of the invention, it is to be understood that the invention is not limited to the details of construction or process steps set forth in the following description. The invention is capable of other embodiments and of being practiced or being carried out in various ways.

Reference throughout this specification to "one embodiment," "certain embodiments," "various embodiments," "one or more embodiments" or "an embodiment" means that a particular feature, structure, material, or characteristic described in connection with the embodiment may be included in at least one embodiment of the invention. Thus, the appearances of the phrases such as "in one or more embodiments," "in certain embodiments," "in various embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

As used herein, the term "permeate" when used to describe the dispersion of the SCR catalyst and/or oxidation catalyst into the porous walls, means that the particular composition penetrates into at least a majority of the hollow regions within the wall thickness, and becomes deposited on the internal surfaces throughout the thickness of the walls. In this manner the material becomes dispersed throughout the wall of the filter.

As used herein, the term "local loading" when used to describe the amount of catalytic material (e.g., PGM, SCR catalyst, oxidation catalyst) present on the porous walls, means the average amount of catalytic material deposited on the walls within the particular zone or zones, that is the indicated loading is not averaged over the entire length of the substrate.

As used herein, a washcoat loading is defined in $g/in^3$, as the total weight of all washcoat components (i.e., PGM, refractory metal oxide support, zeolite, base metals, OSC, etc.) per unit volume of the monolithic substrate. PGM loading is defined in $g/ft^3$, as the total weight of all PGM metals in the catalyst (e.g., Pt+Pd+Rh) per unit volume of the monolithic substrate. Therefore, TWC, DOC CSF and LNT catalysts that use PGM may be uniquely described with both washcoat loading and PGM loading, while SCR catalysts that do not have a PGM component may be described by only the washcoat loading. AMOx catalysts that have both SCR and PGM may be described by both criteria. As used herein, "loading" for the PGM catalyst is the actual weight of PGM affixed to the internal and external surfaces of the porous wall(s) after the wash coat is applied, whereas "loading" for the SCR catalyst is the actual combined weight of metal promotor and molecular sieve material affixed to the internal and external surfaces of the porous wall(s) after the wash coat is applied. In addition, a localized PGM or washcoat loading may be used to specifically describe the weight/volume of the catalyst components in the specific catalyst zone.

In one or more embodiments, the SCR catalyst and/or oxidation catalyst may remain essentially on the surface of the porous filter walls. As used herein, the term "essentially on the surface" when used to describe the dispersion of the SCR catalyst and/or oxidation catalyst on the porous walls, means that at least a majority of the catalyst particles of the particular composition do not penetrate into regions within the wall thickness and become deposited on the internal surfaces throughout the thickness of the walls. Instead, the catalytic material becomes deposited on the outer surfaces of the walls, and a minority of the catalyst particles penetrates no further than about 50% into hollow regions within the wall thickness, or no further than about 33% into hollow regions within the wall thickness, or no further than about 10% into hollow regions within the wall thickness.

In one or more embodiments, the penetration depth may be varied to optimize filter backpressure and interaction with catalyst components applied in separate washcoating steps, wherein the penetration depth may be in the range of about 5% to about 50% of the porous wall thickness, or in the range of about 10% to about 40%, or in the range of about 5% to about 20%, or in the range of about 20% to about 35%.

The problem of balancing the several competing reactions may be addressed by the judicious selection and arrangement of catalytic materials and components in the exhaust stream, where the particulate matter (PM) can be reduced by the use of a porous wall particulate filter, oxides of nitrogen ($NO_x$) can be reduced with a selective catalytic reduction (SCR) catalyst utilizing a reductant (e.g., urea, $NH_3$), ammonia slip can be reduced by an ammonia oxidation catalyst (AMOx).

Principles and embodiments of the present invention relate generally to multi-zone catalyzed filter articles, methods of manufacturing multi-zone catalyzed filter articles, and methods for controlling emissions in gasoline and diesel engine exhaust streams with multi-zone catalyzed filter articles, where the emission treatment system of various embodiments effectively treats diesel engine exhaust with a single multi-zone catalyzed filter article.

In order to remove soot, multi-zone catalyzed filter articles have high filtration capabilities. For catalyst coatings on a filter, two important considerations are backpressure minimization and prevention of bypass of the exhaust around the catalyst disposed in the filter. The minimization of back pressure translates directly into fuel savings and potentially engine life as well.

For a multi-zone catalyzed filter article that uses separate SCR and oxidative catalyst materials to remove NOx by $NH_3$, and CO and HC by $O_2$, the exhaust first passes through the SCR catalyst and then passes across the oxidation catalyst. If the exhaust bypasses the SCR catalyst and first is exposed to the oxidation function, then the reductant (e.g. $NH_3$) will be oxidized to NOx and the NOx abatement function will be compromised, even to the point of emitting greater NOx than the amount that entered the catalyst before the $NH_3$ is added as the reductant.

Integration of NOx reduction and particulate matter (PM) removal functions into a single catalyst article is accomplished using a wall flow substrate coated with an SCR catalyst composition.

Applicants have found a method for applying an SCR catalyst composition to a wall flow substrate to form a substrate that can be used in an application where high filtration efficiency is required. For instance, a substrate formed with this method is suitable for effectively removing particulate matter from exhaust (e.g., greater than 80%, or 90%, or 99%) in the emission treatment system of an embodiment of the invention. The coating method disclosed herein allows wall flow substrates to be loaded with practical levels of SCR catalyst without causing excessive back pressure across the coated article when implemented in emission treatment systems.

In one or more embodiments, the SCR catalyst is disposed throughout the wall of the filter along the entire length and permeates the whole cross-section of the wall. This allows for the SCR catalyst to permeate all filter pores and to spread over the maximum filter volume, thereby minimizing backpressure, and ensuring no by-passing of the SCR catalyst.

In one or more embodiments, the oxidation catalyst is dispersed throughout the wall of the filter along at least a portion of the length and permeates the whole cross-section of the wall. This allows the oxidation catalyst to permeate the filter pores and to spread over the maximum filter volume, thereby minimizing backpressure, and ensuring no by-passing of the oxidation catalyst.

In one or more embodiments, the oxidation catalyst is dispersed throughout the wall of the filter along at least a portion of the length where the oxidation catalyst permeates the whole cross-section of the wall, and the oxidation catalyst is dispersed on the surface of the wall of the filter along at least a portion of the length where the oxidation catalyst does not permeate the whole cross-section of the wall. This allows the majority of the oxidation catalyst to reside primarily on the filter surface, and a minority of the catalyst particles penetrates no further than about 50% into the wall thickness, or no further than about 33% into the wall thickness, or no further than about 10% into the wall thickness, along a portion of the filter wall length.

In various embodiments, the different zones are distinguished from each other by a change in the composition of the catalytic coating, a change in the loading of the catalytic coating, or both, when observed axially along the length of a porous wall.

In one or more embodiments, the oxidation catalyst is dispersed on top of the wall of the outlet channel(s) of the filter substrate. In various embodiments, the oxidation catalyst forms a layer on top of the wall over the SCR catalyst dispersed throughout the wall. The oxidative catalyst allows for some gas passage across the wall directly underneath it, providing that there is sufficient SCR catalyst in the wall to remove NOx prior to the gas crossing the oxidation catalyst.

One or more embodiments of the invention are directed to catalyzed particulate filters comprising a plurality of longitudinally extending passages formed by longitudinally extending porous walls bounding and defining the passages and an axial length extending between an inlet end and an outlet end. The passages comprise inlet passages open at the inlet end and closed at the outlet end, and outlet passages being closed at the inlet end and open at the outlet end.

As used herein, the terms "inlet end" and "outlet end" are in reference to the intended and accepted path of an exhaust gas through a catalytic article, where an untreated exhaust gas passes into a catalytic article at an inlet end, and a treated exhaust gas exits from an outlet end of the catalytic article. In various embodiments, the outlet end of the catalytic article is opposite the inlet end.

In various embodiments, an SCR catalyst composition may be disposed within the porous walls and/or on the walls of the inlet passages extending from the inlet end and less than the full axial length of the wall flow filter, wherein the selective catalytic reduction catalyst comprises a molecular sieve and a transition metal, and an oxidation catalyst comprising a platinum group metal (PGM) is disposed throughout the wall of the filter and/or on the walls of the outlet passages extending from the outlet end and less than the full axial length of the wall flow filter. In one or more embodiments, a portion of the oxidation catalyst can permeate into the filter walls and be intermixed with the SCR catalyst. In some embodiments the catalyst applied to the inlet or outlet channels may form a thin washcoat layer over the inlet or outlet plugs, within the inlet or outlet channels.

As used herein, "platinum group metal" (PGM) refers to platinum, palladium, rhodium, ruthenium, osmium, and iridium, or combinations thereof, and their oxides.

Principles and embodiments of the present invention also relate to a catalyzed particulate filter comprising a substrate having porous walls and at least three catalytic zones formed by two catalytic coatings along the length of the porous walls.

Principles and embodiments of the present invention relate to a catalyzed particulate filter comprising a substrate having porous walls and at least two catalytic zones formed by three catalytic coatings along the length of the porous walls.

Principles and embodiments of the present invention relate generally to effectively treating diesel engine exhaust with a single catalyst article having three or more catalyst zones.

Principles and embodiments of the present invention also relate generally to effectively treating gasoline engine exhaust that requires use of a particulate filter with a single catalyst article having three or more catalyst zones.

Principles and embodiments of the present invention also relate generally to a method of abating exhaust gas from a lean burn engine, wherein the exhaust gas is flowed through an embodiment of a catalyzed particulate filter as described herein, wherein at least five of CO, HC, $NO_x$, soot, $NH_3$ and $H_2S$, and preferably all six of CO, HC, $NO_x$, soot, $NH_3$ and $H_2S$ are partially removed from the exhaust gas by the catalyzed particulate filter.

Particulate Filter

Principles and embodiments of the present invention relate to a catalyzed particulate filter comprising a substrate having porous walls and at least three catalytic zones along the length of the porous walls, where each of the at least three catalytic zones may comprise a first selective catalytic reduction catalyst, a platinum group metal oxidation catalyst, and a second selective catalytic reduction catalyst.

In one or more embodiments, the particulate filter comprises a plurality of porous walls having a length extending longitudinally to form a plurality of parallel passages extending from an inlet end to an outlet end, wherein a quantity of the passages are inlet passages that are open at the inlet end and closed at the outlet end, and a quantity of passages different from the inlet passages are outlet passages that are closed at the inlet end and open at the outlet end. In various embodiments, the passages are closed with a plug, wherein the plug may have a length of about ¼" long.

In one or more embodiments, the particulate filter has an inlet end into which gases may enter the inlet passages, and an outlet end from which gases may exit the outlet passages, where the gases pass from an inlet passage to an outlet passage by moving through the porous walls forming the parallel passages.

In one or more embodiments, the porous walls have a porosity in the range of about 40% to about 75%, or in the range of about 40% to about 60%, or in the range of about 50% to about 70%, or in the range of about 50% to about 65%, or in the range of about 60% to about 70%, or in the range of about 55% to about 65%. In various embodiments the porous walls have a porosity in the range of about 60% to about 65%.

In one or more embodiments, the mean pore size of the porous walls is in the range of about 10 μm to about 30 μm, or about 10 μm to about 25 μm, or about 20 μm to about 25 μm. In various embodiments, the mean pore size of the porous walls is in the range of about 15 μm to about 25 μm.

In one or more embodiments, at least three catalytic zones are formed along the wall length by catalytic material permeating the thickness of the porous walls over at least a portion of the wall length. In various embodiments, the at least three catalytic zones include a first catalytic zone (also referred to as a first zone or first upstream zone) extending from the inlet end, a second catalytic zone (also referred to as a second zone) downstream from the first zone, and a third catalytic zone (also referred to as a third zone) downstream from the second zone. In various embodiments, each of the zones is distinguished from the zone immediately upstream and/or downstream by a change in catalytic material composition, catalytic material loading, catalytic material placement on or in the wall(s), or combinations thereof.

In one or more embodiments a second SCR coating is applied from the inlet end and may optionally permeate the walls for full or optionally a portion of the full inlet channel. This second SCR coating may be the same or different than the first SCR coating.

In various embodiments, reference to a coating "extending from" an inlet end or an outlet end indicates that the coating starts at one end of the wall and progresses along the wall length towards the opposite end, or where a feature of the coating, such as being on the surface, may start a distance from the actual inlet opening, reference to the coating feature "extending from" an inlet end or an outlet end indicates the coating feature progresses along the wall length towards the opposite end. For example, a second zone between a first and third zone may include a coating on the surface that extends a percentage of the wall length from the inlet or outlet end, but does not start at the inlet or outlet end, can indicate the direction that the coating extends.

As used herein, "catalytic material loading" refers to a weight of material comprising one or more catalytically active component(s) deposited on and/or into the walls of a catalytic article, where the catalytically active components may be a platinum group metal (e.g., Pt, Pd, Rh), and/or a transition metal (e.g., Cu, Fe, Co, Ni, La, V, Mo, W, Mn, Ce, Ag). The catalytic material may further comprise a support material onto which the catalytically active component(s) are dispersed, and/or into which the catalytically active component(s) are impregnated, wherein the support material may be alumina, titania, zirconia, silica, silica/alumina, or a combination thereof.

In one or more embodiments, the first upstream zone may comprise a first selective catalytic reduction catalyst at a first loading. In various embodiments, the first loading of the first selective catalytic reduction catalyst may be in the range of about 0.1 $g/in^3$ to about 3 $g/in^3$, or about 0.5 $g/in^3$ to about 2.5 $g/in^3$, or about 0.5 $g/in^3$ to about 2 $g/in^3$.

In one or more embodiments, the second zone may comprise a selective catalytic reduction catalyst at a first loading and either a platinum group metal oxidation catalyst at a first loading or the selective catalytic reduction catalyst at a second loading.

In one or more embodiments, the third zone may comprise a platinum group metal oxidation catalyst, and a selective catalytic reduction catalyst at one of a first loading and a second loading.

In one or more embodiments, the first catalytic zone is a first upstream zone extending from the inlet end of the substrate, the second zone is adjacent to and downstream from the first upstream zone, and the third zone is adjacent to and downstream from the second zone.

In one or more embodiments, the catalyzed particulate filter may further comprise a fourth zone adjacent to and extending downstream from the third zone.

In one or more embodiments, the first upstream zone extends about 1% to about 98% of the wall length from the inlet end of the passage(s); the second zone extends from about 1% to about 98% of the wall length from the first upstream zone, the third zone extends about 1% to about 98% of the wall length from the second zone; and the fourth zone extends the balance of the wall length from the third zone to the outlet end of the passage(s).

In one or more embodiments, the first upstream zone extends about 1% to about 50% of the wall length from the inlet end.

In one or more embodiments, the second zone extends from about 1% to about 50% of the wall length from the first upstream zone.

In one or more embodiments, the third zone extends from about 1% to about 97% of the wall length from the second zone.

In one or more embodiments, the fourth zone extends from about 1% to about 50% of the wall length from the third zone.

In one or more embodiments, the length of porous wall permeated with a first coating is in the range of about 1% to about 80%, or about 1% to about 70%, or about 10% to about 66% of the wall length extending from the outlet end of the passages, and the length of porous wall permeated with a second coating is in the range of about 50% to about 100%, or about 50% to about 80%, or about 30% to about 70% of the wall length extending from the inlet end of the passages. In various embodiments, the length of porous wall permeated with the second coating is in the range of about 50% to about 80% of the wall length extending from the inlet end of the passages, and the length of porous wall permeated with a first coating is in the range of about 1% to about 70%.

In one or more embodiments, the second coating permeates the porous walls of the particulate filter over essentially the entire length of the porous walls of the particulate filter, and the first coating is intermingled with the second coating over about 1% to about 70% of the wall length extending from the outlet end of the passages.

Selective Catalytic Reduction Catalyst

In one or more embodiments, the second coating is a selective catalytic reduction catalyst comprising a molecular sieve and a metal. In one or more embodiments, the selective catalytic reduction catalyst comprises a molecular sieve. In various embodiments, the molecular sieve may have a zeolitic framework, and the zeolitic framework may have ring sizes no larger than 12.

In one or more embodiments, the zeolitic framework material comprises a double-six ring (d6r) unit. In one or more embodiments, the zeolitic framework material may be selected from AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, WEN, and combinations thereof. In various embodiments, the zeolitic framework material may be selected from AEI, CHA, AFX, ERI, KFI, LEV, and combinations thereof. In various embodiments, the zeolitic framework material may be selected from AEI, CHA, and AFX. In various embodiments, the zeolitic framework material is CHA. In one or more embodiments, the selective catalytic reduction catalyst further comprises a metal, which may be a base metal (e.g., wherein the SCR catalyst is in the form of a molecular sieve promoted with the metal).

In various embodiments, the selective catalytic reduction catalyst is promoted with a metal selected from Cu, Fe, Co, Ni, La, Ce, Mn, V, Ag, and combinations thereof. In various embodiments, the selective catalytic reduction catalyst is promoted with a metal selected from Cu, Fe, Ag, and combinations thereof. In various embodiments, the selective catalytic reduction catalyst is promoted with Cu and/or Fe.

In one or more embodiments, the zeolitic framework material is CHA promoted with copper or iron.

In one or more embodiments, the copper or iron promoted CHA structure type molecular sieve may be mixed with a plurality of platinum group metal impregnated alumina and/or silica/alumina particles to form a slurry.

In one or more embodiments, the selective catalytic reduction catalyst may be at a first loading or at a second loading, wherein the first loading may be in the range of about 0.5 $g/in^3$ to about 3 $g/in^3$, and the second loading may be in the range of about 0.5 $g/in^3$ to about 3 $g/in^3$, where the second loading may be the same or different from the first loading. In various embodiments, the potential loading in an overlapping zone may be in the range of about 1.0 g/in³ to about 5.0 g/in³.

In one or more embodiments, the first loading of the first selective catalytic reduction catalyst on the first upstream zone may be in the range of about 0.5 g/in³ to about 3 g/in³, or in the range of about 0.5 g/in³ to about 2.5 g/in³, or in the range of about 0.5 g/in³ to about 2 g/in³.

In one or more embodiments, the first loading of the first selective catalytic reduction catalyst on the second zone may be in the range of about 0.5 g/in³ to about 3 g/in³, or in the range of about 0.5 g/in³ to about 2.5 g/in³, or in the range of about 0.5 g/in³ to about 2 g/in³.

In one or more embodiments, the first loading of the first selective catalytic reduction catalyst on the third zone may be in the range of about 0.5 g/in³ to about 3 g/in³, or in the range of about 0.5 g/in³ to about 2.5 g/in³, or in the range of about 0.5 g/in³ to about 2 g/in³.

In one or more embodiments, the first loading of the first selective catalytic reduction catalyst on the forth zone may be in the range of about 0.5 g/in³ to about 3 g/in³, or in the range of about 0.5 g/in³ to about 2.5 g/in³, or in the range of about 0.5 g/in³ to about 2 g/in³.

A non-limiting example of a selective catalytic reduction catalyst is a CHA zeolitic framework material promoted with copper having a silica to alumina molar ratio in the range of about 10 to about 100, more specifically, about 10 to about 75, and even more specifically about 10 to about 60. In various embodiments, at least 0.5 g/in³ of an SCR composition, or no more than about 3 g/in³ of an SCR composition, and in particular, about 1.0 g/in³ to about 2.0 g/in³, may be disposed on the porous walls of the filter. In various embodiments, the first loading of a selective catalytic reduction catalyst in the second catalytic zone may be in the range of about 0.5 g/in³ to about 2 g/in³.

Oxidation Catalyst

Principles and embodiments of the present invention relate to an oxidation catalyst comprising a PGM disposed on at least one zone of the catalyzed particulate filter. In one or more embodiments, the first coating is an oxidation catalyst comprising platinum, palladium, or a combination thereof. In various embodiments, the oxidation catalyst is an ammonia oxidation catalyst.

In one or more embodiments, the PGM may be selected from platinum, palladium, rhodium, ruthenium, osmium, and iridium, or combinations thereof. In various embodiments, the PGM may be selected from platinum, palladium, or combinations thereof.

In one or more embodiments, the oxidation catalyst comprises at least one platinum group metal on a plurality of particles, and the plurality of particles of the oxidation catalyst may have a composition of alumina, titania, zirconia, silica, silica/alumina, or a combination thereof. In one or more embodiments, the platinum group metal may be impregnated into the alumina, titania, zirconia, silica, and/or silica/alumina particles by the incipient wetness technique followed by a thermal treatment between about 400° C. and about 600° C. In various embodiments, the loading of platinum group metal onto the length of porous wall permeated with the slurry is in the range of about 0.1 g/ft³ to about 50 g/ft³.

In various embodiments, the loading of platinum group metal onto the length of porous wall permeated with the slurry is in the range of about 0.1 g/ft³ to about 50 g/ft³, or in the range of about 1 g/ft³ to about 50 g/ft³.

In one or more embodiments, the platinum group metal loading in the second catalytic zone may be in the range of about 0.1 g/ft³ to about 50 g/ft³, or in the range of about 1 g/ft³ to about 50 g/ft³.

In one or more embodiments, the oxidation catalyst is a PGM slurry having a D90<3 microns, or a D90<5 microns, or a D90<10 microns, or D90≈5-7 microns. In various embodiments, a copper or iron promoted CHA structure type molecular sieve may be mixed with the oxidation catalyst slurry.

Manufacturing Methods

Principles and embodiments of the present invention also relate to a method of manufacturing a catalyzed particulate filter article having at least three catalytic zones, wherein the at least three catalytic zones are formed using at least three catalytic coatings.

In one or more embodiments, an oxidation catalyst may be introduced into an outlet end of a plurality of parallel passages formed by a plurality of porous walls closed by a plug on an inlet end opposite the outlet end, wherein the particles of the oxidative catalyst permeates through the porous walls, and wherein the length of porous wall permeated with the oxidation catalyst is in the range of about 1% to about 80% or in the range of about 10% to about 70%, or about 60% to about 70% of the wall length extending from the outlet end of the passages.

In one or more embodiments, a selective catalytic reduction catalyst comprising a plurality of particles may be introduced into an inlet end of a plurality of parallel passages formed by a plurality of porous walls closed by a plug on an outlet side opposite the inlet side, wherein the particles of the selective catalytic reduction catalyst permeates through the porous walls, wherein the length of porous wall permeated with the particles of the selective catalytic reduction catalyst is in the range of about 20% to about 100%, or about 50% to about 100%, or about 50% to about 80%, or about 60% to about 70% of the wall length extending from the inlet end of the passages.

In various embodiments, the oxidation catalyst may comprise a plurality of particles, for example, as a slurry of inorganic support material coated and/or impregnated with a PGM, wherein the oxidation catalyst may be an ammonia oxidation catalyst.

In one or more embodiments, the oxidation catalyst is introduce into the outlet end of the plurality of parallel passages before the selective catalytic reduction catalyst is introduce into the inlet end of the plurality of parallel passages. In various embodiments, a first selective catalytic reduction catalyst is introduce into the inlet end of the plurality of parallel passages before the oxidation catalyst is introduce into the outlet end of the plurality of parallel passages.

In one or more embodiments, the particles of the oxidation catalyst are interspersed with the particles of the selective catalytic reduction catalyst within the plurality of porous walls, wherein the particles of the selective catalytic reduction catalyst and the oxidation catalyst are interspersed on the surfaces and/or within the void space of the porous walls. In various embodiments, the porosity of the porous walls is in the range of about 60% to about 65%.

In one or more embodiments, the length of porous wall permeated with the selective catalytic reduction catalyst is in the range of about 50% to about 80% of the wall length extending from the inlet end of the passages, the length of porous wall that is not permeated with the selective catalytic reduction catalyst, but permeated with the oxidative catalyst, is in the range of about 25% to about 55% of the wall length extending from the outlet end of the passages, and the length of porous wall permeated with the selective catalytic reduction catalyst and the overlapping oxidation catalyst is in the range of about 5% to about 35% of the wall length. In various embodiments, the selective catalytic reduction catalyst at the inlet end of the porous wall forms a first zone, the oxidation catalyst at the outlet end of the porous wall forms a third zone, and the overlapping catalytic reduction catalyst and oxidation catalyst forms a second zone wherein the second zone is between and adjacent to the first zone and the third zone.

In one or more embodiments, the length of porous wall permeated with the oxidation catalyst is in the range of about 25% to about 55% of the wall length extending from the outlet end of the passages. The length of porous wall permeated with the selective catalytic reduction catalyst is in the range of about 50% to about 80% of the wall length extending from the inlet end of the passages.

In one or more embodiments, the first selective catalytic reduction catalyst is introduced into the inlet end of the plurality of parallel passages before the oxidation catalyst is introduce into the outlet end of the plurality of parallel passages.

In various embodiments, the oxidation catalyst remains essentially on the surface of the overlapping portion of the porous wall without interspersing with the selective catalytic reduction catalyst, located within the porous walls.

In one or more embodiments, a second selective catalytic reduction catalyst may be introduced into the outlet end of the plurality of parallel passages, wherein the second selective catalytic reduction catalyst may permeate through the portion of the porous walls of the particulate filter not previously permeated with the first selective catalytic reduction catalyst, and/or deposit essentially on the surface of the porous walls previously coated on the surface with an oxidation catalyst.

In one or more embodiments, the first selective catalytic reduction catalyst is introduced into the inlet end of the plurality of parallel passages before the oxidation catalyst is introduced into the outlet end of the plurality of parallel passages, and the second selective catalytic reduction catalyst is introduced into the outlet end of the parallel passages after the oxidation catalyst is introduce into the outlet end of the plurality of parallel passages. In various embodiments, an oxidation catalyst is introduced into the inlet end of the plurality of parallel passages after the first selective catalytic reduction catalyst is introduced into the inlet end of the plurality of parallel passages.

In one or more embodiments, the oxidation catalyst is introduced into the outlet end of the plurality of parallel passages before the first selective catalytic reduction catalyst is introduced into the inlet end of the plurality of parallel passages, where the first selective catalytic reduction catalyst is introduced a distance less than the full length of the porous walls, and the second selective catalytic reduction catalyst is introduced into the outlet end of the parallel passages after the first selective catalytic reduction catalyst is introduced into the inlet end of the plurality of parallel passages, where the second selective catalytic reduction catalyst overlaps with the first selective catalytic reduction catalyst for at least a portion of the length of the porous walls. In various embodiments, the oxidation catalyst overlaps with the first selective catalytic reduction catalyst for at least a portion of the length of the porous walls. In various embodiments, the particles of the oxidation catalyst are interspersed with the particles of the first selective catalytic reduction catalyst within the plurality of porous walls.

In one or more embodiments, the length of porous wall permeated with the particles of the selective catalytic reduction catalyst is in the range of about 95% to about 100% of the wall length extending from the inlet end of the passages, the length of porous wall coated on the surface with the particles of the oxidation catalyst is in the range of about 1% to about 70% of the wall length extending from the outlet end of the passages. In various embodiments, the second selective catalytic reduction catalyst may be coated onto the surfaces of the porous walls in the range of about 10% to about 70% of the wall length, wherein the length of wall coated with the second selective catalytic reduction catalyst extends from the outlet end of the passages.

In one or more embodiments, a selective catalytic reduction catalyst comprises a plurality of particles comprising a copper or iron promoted CHA structure type molecular sieve.

In one or more embodiments, a platinum group metal may be coated onto the exterior surface of a plug on the outlet side of the parallel passages. In various embodiments, the platinum group metal may be coated onto the surfaces of the porous walls in the range of about 5%, or no more than 5%, or no more than 3%, or no more than 2%, or no more than 1% of the wall length extending from the outlet end of the outlet passages, or no more than double the length of the plug.

In a non-limiting example of a process to coat the wall flow substrates with the SCR catalyst composition and/or oxidation catalyst, the substrate may be immersed vertically in a portion of a catalyst slurry of solid particles in a liquid such that the top of the substrate is located just above the surface of the slurry. The sample is left in the slurry for about 30 seconds. The substrate is removed from the slurry, and excess slurry is removed from the wall flow substrate first by allowing it to drain from the channels, then by blowing with compressed air (against the direction of slurry penetration). Depending upon the pore size of the filter, the mean particle size of the SCR catalyst slurry, and prior processing steps, the SCR catalyst slurry may be deposited on and/or permeate into the porous walls of the filter, such that the pores are not occluded to the extent that undue back pressure will build up in the finished substrate. In various embodiments, the oxidation catalyst slurry may be deposited on and/or permeate into the porous walls of the filter. In various embodiments, a second SCR catalyst may be applied to either the inlet or outlet channels to deposit on and/or permeate into the porous walls of the filter. In various embodiments, a second oxidation catalyst may be applied to the inlet and/or outlet channels to deposit on the surface of the porous walls of the filter.

Multi-Zone Catalytic Exhaust System and Methods of Reducing Emissions

Principles and embodiments of the present invention also relate to catalytic exhaust systems incorporating at least one catalyzed particulate filter, as described herein. In various embodiments, the catalytic exhaust system may comprise a catalyzed particulate filter and one or more additional components for reducing a plurality of gaseous pollutants and some proportion of the particulate matter.

In one or more embodiments, a urea injector, also referred to as a reductant dosing system, may be provided upstream of the catalyzed particulate filter to inject a NOx reductant into the exhaust stream to facilitate operation of an SCR catalyst incorporated into the catalyzed particulate filter. As disclosed in U.S. Pat. No. 4,963,332, which is hereby incorporated by reference in its entirety for all purposes, NOx upstream and downstream of the catalytic converter can be sensed, and a pulsed dosing valve can be controlled by the upstream and/or downstream signals.

In alternative configurations, the systems disclosed in U.S. Pat. No. 5,522,218, which is hereby incorporated by reference in its entirety for all purposes, the pulse width of the reductant injector may be controlled from sensor values and/or maps of exhaust gas temperature and engine operating conditions such as engine rpm, transmission gear and engine speed. Reductant pulse metering systems are described in U.S. Pat. No. 6,415,602, the discussion of which is hereby incorporated by reference in its entirety for all purposes.

In various embodiments, the exhaust system may comprise an exhaust manifold, an exhaust pipe (or a down pipe, or a Y-pipe), a muffler, and a tailpipe. A catalytic exhaust system may be inserted into the exhaust system at the Y-pipe and/or exhaust pipe to treat the exhaust gas from the internal combustion engine prior to the gases exiting the tailpipe to the atmosphere.

In one or more embodiment, the catalytic exhaust system comprises a monolithic catalytic substrate having a length, a width, a height, and a precious metal loading. In various embodiments, the monolithic catalytic substrate has a shape that may be cylindrical, having a diameter that defines a cross-sectional area, and a length; elliptical, having a major axis and a minor axis that defines a cross-sectional area, and a length; or oblong, having a chief axis and a transverse diameter that defines a cross-sectional area, and a length, and wherein the monolithic catalytic substrate has a precious metal loading to provide an intended level of catalytic activity.

In one or more embodiments, the precious metal loading may comprise one or more platinum group metals, one or more base metals, one or more precious and/or base metal oxides, or a combination thereof.

In various embodiments, the catalytic exhaust system may comprise two-way catalysts, three-way catalysts (TWCs) (used primarily on stoichiometric-burning gasoline engines), diesel oxidation catalysts (DOCs) (used primarily on lean-burning diesel engines), selective catalytic reduction (SCR) catalysts, lean nitrous oxide catalysts (LNCs), ammonia slip catalysts (ASCs), ammonia oxidation catalysts (AMOx), NOx absorbers also called NOx storage/release catalysts (NSRs) and lean $NO_x$ trap (LNTs), diesel particulate filters (DPFs), gasoline particulate filters (GPFs), partial oxidation catalysts (POCs), and catalyzed soot filters (CSFs), as well as combinations thereof. In various embodiments, the catalytic exhaust system may include but not be limited to a Diesel Oxidation Catalyst (DOC), Lean NOx trap (LNT), Passive NOx Absorber (PNA), Selective Catalytic Reduction (SCR) with an associated ammonia injection and Ammonia Oxidation catalyst (AMOx).

In various embodiments, a monolithic catalytic substrate may be coated with at least one wash-coat layer containing one or more catalytic materials that may be selected from the platinum group metals, base metals, and metal oxides, and the substrate housed within a shell.

In one or more embodiments, the catalytic converter may comprise a monolithic catalytic substrate encased within a shell having an inlet and an outlet, wherein the shell may be housed within a housing that may be operatively associated and in fluid communication with an exhaust system of an internal combustion engine.

Figure 2:
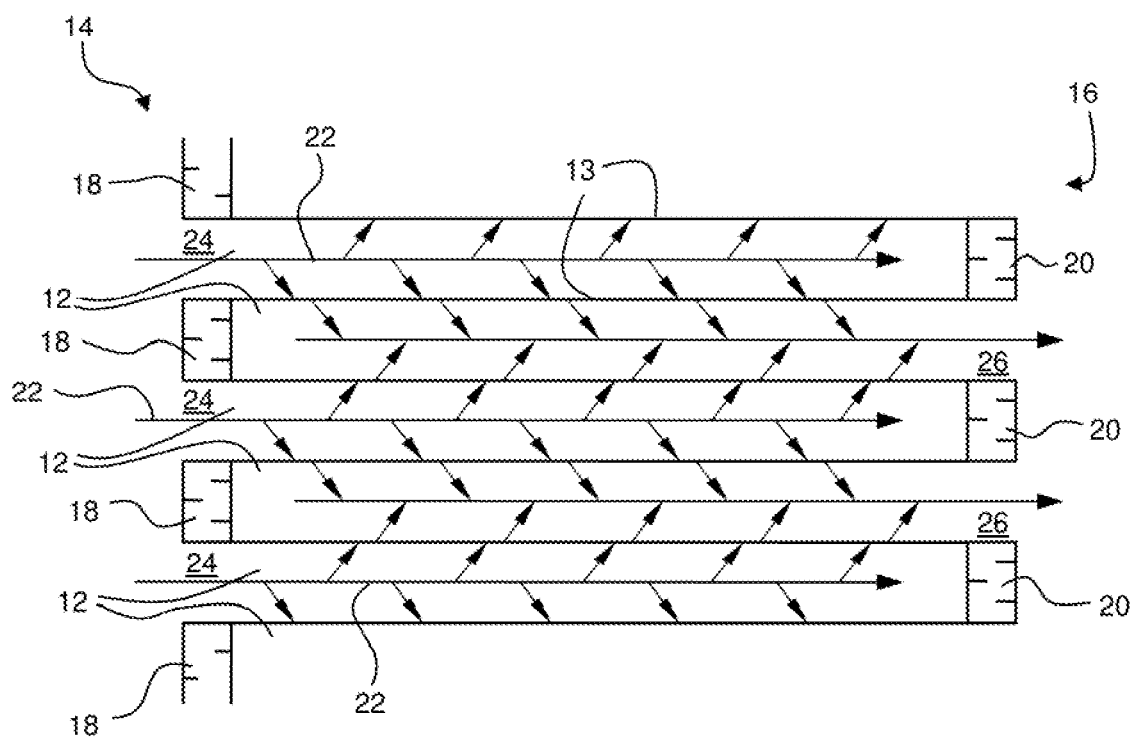
FIG. 2 illustrates a cross-sectional view of an exemplary embodiment of a plurality of porous walls extending longitudinally from an inlet end to an outlet end of a wall flow filter substrate.

FIGS. 1 and 2 illustrate a typical wall flow filter substrate 10 (also referred to as a wall flow filter) which has a plurality of passages 12. The passages are formed and tubularly enclosed by the internal walls 13 of the filter substrate. FIG. 1 depicts an external view of an embodiment of a wall flow filter substrate having an inlet end 14 and an outlet end 16. Alternate passages are plugged at the inlet end with inlet plugs 18 (shown in black), and at the outlet end with outlet plugs 20 to form opposing checkerboard patterns at the inlet 14 and outlet 16 ends of the substrate. The outlet plugs 20 have an interior surface 21 facing into the passage and an exterior surface 23 facing outward.

FIG. 2 illustrates a cross-sectional view of an embodiment of a plurality of porous walls extending longitudinally from an inlet end to an outlet end of a wall flow filter substrate. A partial cross-sectional view of an embodiment of a plurality of porous walls 13 extending longitudinally from an inlet end 14 to an outlet end 16, and forming a plurality of parallel passages 12 is shown. A gas stream 22 (shown as arrows) enters through the open, unplugged end of inlet passages 24, is stopped at the closed end by outlet plug 20, and diffuses through the porous walls 13 forming the passages to the outlet passages 26. The gas stream 22 exits the filter by flowing through the open, unplugged end of outlet passages 26, and is stopped at the closed end by inlet plug 18. The gas is prevented from flowing backwards to the inlet end of the filter from the outlet passages by the inlet plugs 18, and prevented from re-entering the inlet passages from the outlet end by the outlet plugs 20. In this manner, a quantity of the passages are inlet passages that are open at the inlet end and closed at the outlet end, and a quantity of passages are outlet passages that are closed at the inlet end and open at the outlet end, where the outlet passages are different passages than the inlet passages.

Figure 3:
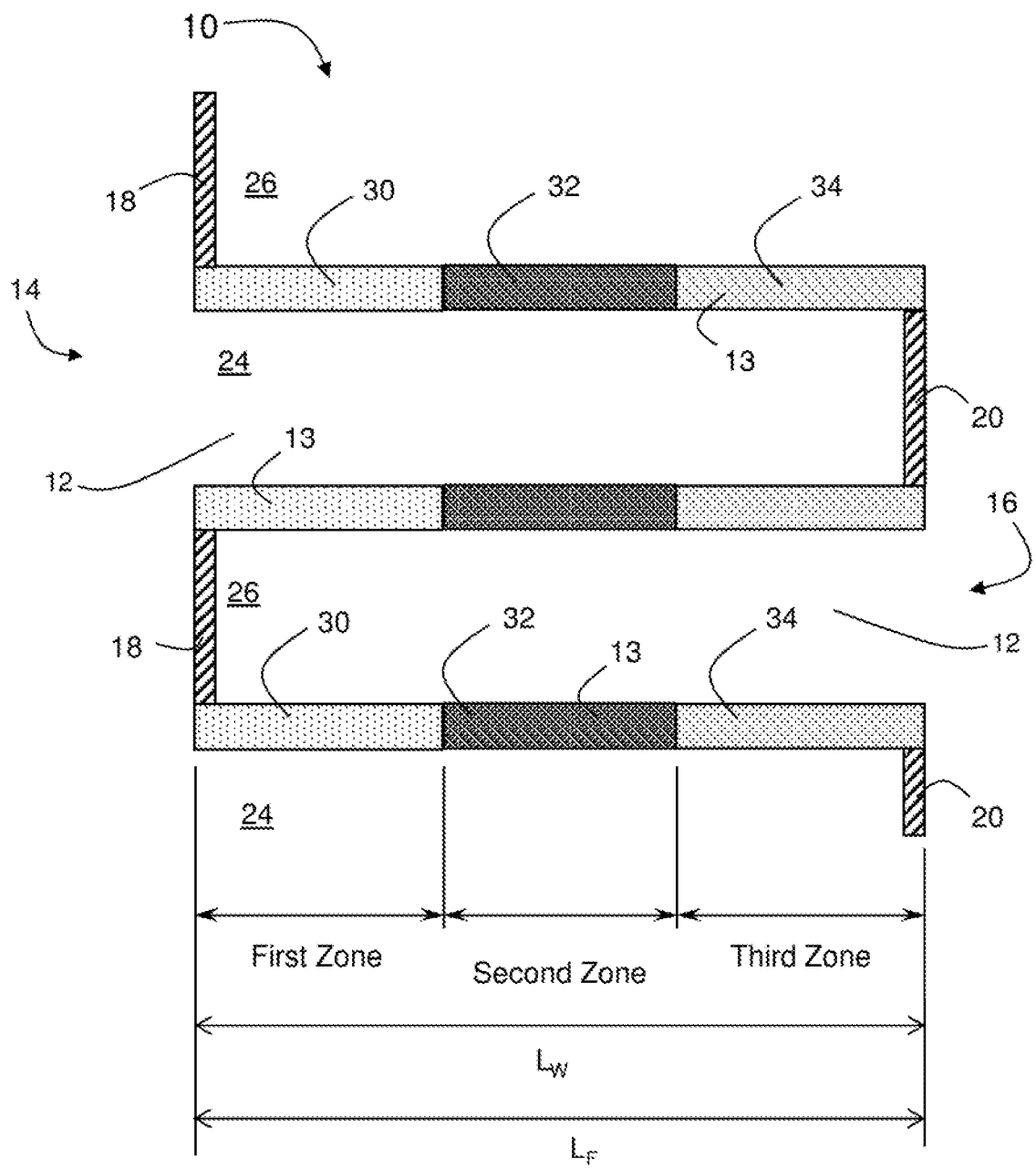
FIG. 3 illustrates a magnified view of a cross-section of an exemplary embodiment of a plurality of porous walls of a wall flow filter substrate depicting three zones.

FIG. 3 illustrates a magnified view of a cross-section of an exemplary embodiment of a plurality of porous walls of a wall flow filter substrate having a plurality of zones. The catalyst article shown comprises a wall flow filter 10 having a plurality of longitudinally extending passages 12 formed by longitudinally extending porous walls 13 bounding and defining the passages 24 and 26, where the walls have an axial length '$L_w$' extending between an inlet end 14 and an outlet end 16 of the wall flow filter having a length '$L_F$'. In various embodiments, filter length '$L_F$'≥axial wall length '$L_w$'. In various embodiments, the porous walls have substantially uniform porosity throughout. The passages 24 and 26 comprise inlet passages 24 which are open at the inlet end 14 and closed at the outlet end 16, and outlet passages 26 which are closed at the inlet end 14 and open at the outlet end 16.

In one or more embodiments, a catalytic substrate may be configured to have at least three catalytic zones, wherein the catalytic zones are distinguished from each other by the spatial arrangement of two or more catalytic components. In various embodiments, the catalytic components may be an SCR catalyst and an AMOx catalyst.

In one or more embodiments, at least three catalytic zones 30, 32, 34, are formed by at least three catalytic coatings along the length '$L_w$' of the porous walls 13, wherein the coating(s) may permeate the thickness of the porous walls 13. In various embodiments, the at least three catalytic coatings are disposed along the length '$L_w$' of the porous walls 13 in different spatial arrangements.

In various embodiments, the different zones may be distinguished from each other by a change in the composition of the catalytic coating, a change in the loading of the catalytic coating, a change in the combination of one or more catalytic coatings, or any combination thereof, along the length of a porous wall.

In various embodiments, a first coating is a first SCR catalyst coating, a second coating is a second SCR catalyst coating, and a third coating is a platinum group metal coating.

In one or more embodiments, a first zone 30 extends axially from the inlet end 14 of the porous walls 13 a distance less than the full length of the porous wall and a second zone 32 extends axially from the first zone 30 a distance less than the distance to the outlet end 16 of the porous wall 13. In various embodiments, a first zone 30 comprises or consists essentially of the first SCR catalyst coating, and a second zone 32 comprises or consists essentially of the platinum group metal coating and the first SCR catalyst coating.

In one or more embodiments, a third zone 34 extends axially from the second zone 32 to the outlet end 16 of the porous wall(s) 13. In various embodiments, the third zone 34 comprises or consists essentially of a platinum group metal coating and a second SCR catalyst coating.

In one or more embodiments, the first zone 30 may comprise an SCR catalyst to reduce the oxides of nitrogen ($NO_x$) in an exhaust gas, the second zone 32 may comprise an ammonia oxidation ("AMOx") catalyst to prevent ammonia ($NH_3$) used with the SCR catalyst from exiting the catalytic substrate in the exhaust stream, and/or a diesel oxidation catalyst ("DOC") to reduce the amount of carbon monoxide ("CO") and unburned hydrocarbons ("HC") components in the exhaust gas, the third zone may comprise an AMOx and/or DOC catalyst and a second SCR catalyst to reduce or eliminate $NO_x$ remaining in the exhaust gas or produced by oxidation of the $NH_3$ by the oxidation catalysts, and the porous walls of the catalytic substrate reduce or eliminate the particulate matter (PM) in the exhaust gas.

Reference to a zone that consists essentially of a specified coating, within this application, means only the specified coating was intentionally deposited within the specified zone, and while other components may inadvertently deposit or migrate into the zone, the majority of material in the zone is the specifically deposited material.

Figure 4:
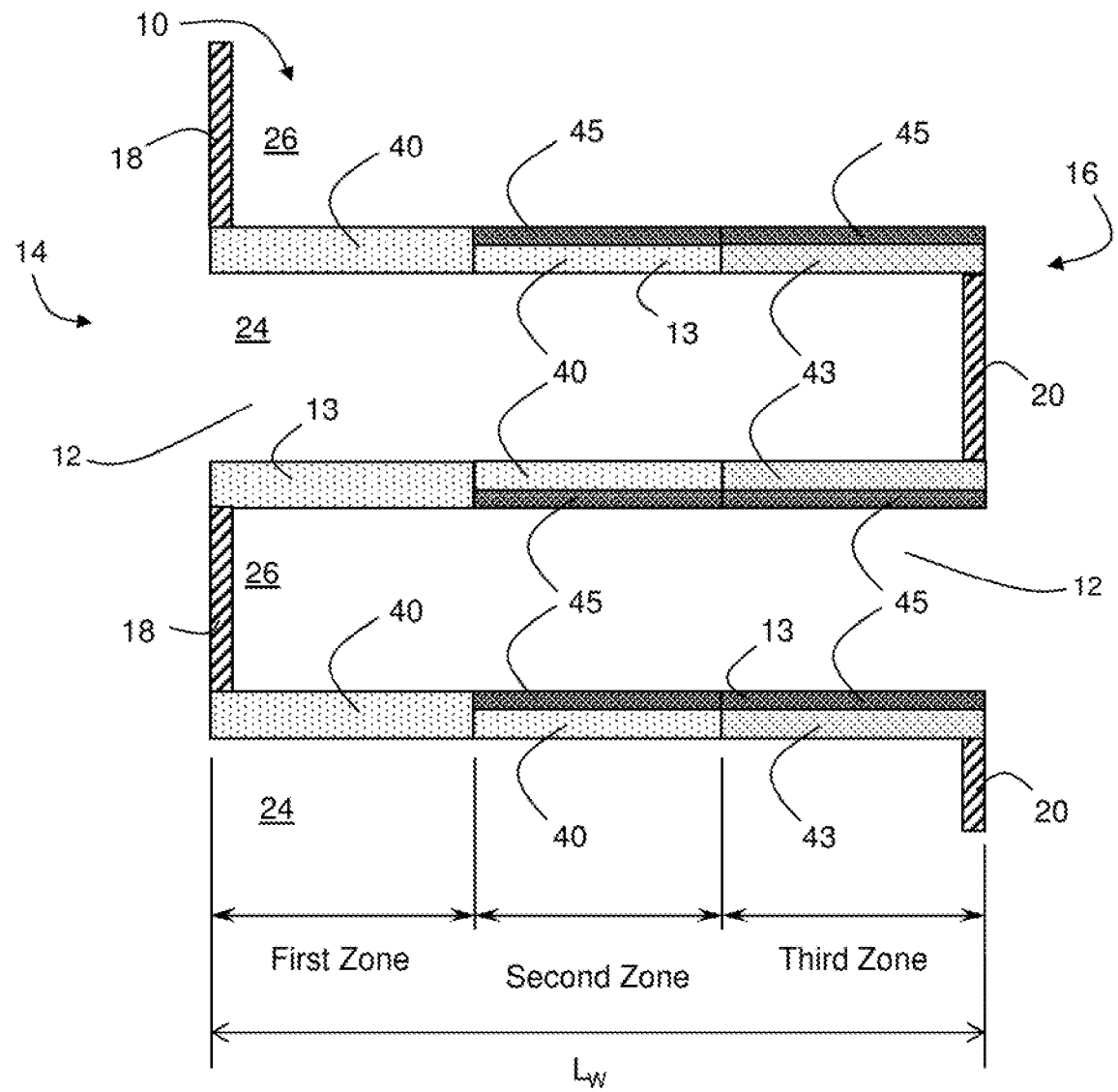
FIG. 4 illustrates a magnified view of a cross-section of an exemplary embodiment of a plurality of porous walls of a wall flow filter substrate having a plurality of zones formed by a plurality of coatings.

FIG. 4 illustrates a magnified view of a cross-section of an exemplary embodiment of a plurality of porous walls of a wall flow filter substrate having a plurality of zones. While FIG. 4 may depict the coatings occupying a portion of the thickness of the porous walls in the zones, this is only as a representation and in various embodiments the coatings may permeate throughout the thickness of the porous wall, or penetrate a distance into the porous wall depending upon the viscosity of the coating(s) and/or particle and pore sizes.

In one or more embodiments, at least three catalytic zones are formed along the length '$L_w$' of the porous walls 13, and permeating the thickness of the porous walls 13. In one or more embodiments, a first zone 30 may extend axially from the inlet end 14 of the porous wall 13, where the first zone may extend a distance from the inlet end 14 of the porous wall 13 less than the full length of the porous wall 13. In various embodiments, the first zone 30 may comprise a first selective catalytic reduction (SCR) catalyst 40 at a first loading. In one or more embodiments, an SCR catalyst composition may be disposed within at least a portion of the length of the plurality of porous walls 13 and permeate through the porous wall(s) over about 1% to about 98% of the wall length. In various embodiments, the first selective catalytic reduction catalyst first loading 41 may be in the range of about 0.5 g/in³ to about 3 g/in³, or about 0.5 g/in³ to about 2.5 g/in³, or about 0.5 g/in³ to about 2 g/in³.

In one or more embodiments, a second zone 32 downstream of the first zone 30 may extend axially at least a portion of the length of the plurality of porous walls 13, where the second zone may extend a distance from the first zone less than the length of the porous walls 13 to the outlet end 16 of the porous walls 13. In various embodiments, the second zone 32 may comprise a first selective catalytic reduction catalyst 40 at a first loading and a platinum group metal oxidation catalyst 45 at a first loading 46, or a second selective catalytic reduction catalyst 43 at a second loading and a platinum group metal oxidation catalyst 45 at a first loading 46. In various embodiments, the second selective catalytic reduction catalyst second loading may be in the range of about 0.5 g/in³ to about 3 g/in³, or in the range of about 0.5 g/in³ to about 2.5 g/in³, or in the range of about 0.5 g/in³ to about 2 g/in³. In various embodiments, the selective catalytic reduction catalyst second loading may be in the range of about 0.5 g/in³ to about 3 g/in³, or in the range of about 0.5 g/in³ to about 2.5 g/in³, or in the range of about 0.5 g/in³ to about 2 g/in³. In various embodiments, the second SCR loading may be in an amount that is the same as or different from the first SCR loading 42. In various embodiments, the platinum group metal oxidation catalyst first loading 46 may be in the range of about 0.5 g/ft³ to about 50 g/ft³.

In various embodiments, the platinum group metal oxidation catalyst 45 may be disposed within at least a portion of the length of the plurality of porous walls 13, and/or on at least a length of the walls 13 of the outlet passages 26 extending from the outlet end 16 for less than the axial length '$L_w$' of the wall flow filter walls.

In one or more embodiments, the first selective catalytic reduction catalyst 40 may have the same or a different composition than the second selective catalytic reduction catalyst 43. In various embodiments, the second SCR loading may be in an amount that is the same as or different from the first SCR loading.

In one or more embodiments, the first SCR catalyst coating and the second catalyst coating may each comprise a molecular sieve with a zeolitic framework material selected from AEI, CHA, and AFX, where the first SCR catalyst and the second catalyst may be independently promoted with a metal selected from Cu, Fe, Co, Ni, La, Ce, Mn, V, Ag, or combinations thereof.

In one or more embodiments, the first selective catalytic reduction catalyst 40 may have the same or a different composition than the second selective catalytic reduction catalyst 43. In various embodiments, the second SCR loading may be in an amount that is the same as or different from the first SCR loading. In various embodiments, the platinum group metal oxidation catalyst first loading 46 may be in the range of about 0.5 g/ft³ to about 50 g/ft³.

In one or more embodiments, the second zone may comprise an ammonia oxidation catalyst (AMOx).

In one or more embodiments, a third zone 34 downstream of the second zone 32 may extend the length of the porous walls 13 from the second zone 32 to the outlet end of the porous walls 13. In various embodiments, the third zone 34 may comprise a first selective catalytic reduction catalyst 40 at one of the first loading and/or the second selective catalytic reduction catalyst 43 at a second loading, and the platinum group metal oxidation catalyst 45 at the first loading 46. In one or more embodiments, an SCR catalyst composition may be disposed within at least a portion of the length of the plurality of porous walls 13 and permeate through the porous wall over about 1% to about 98% of the wall length. In various embodiments, the selective catalytic reduction catalyst second loading 42 may be in the range of about 0.5 g/in³ to about 3 g/in³, or in the range of about 0.5 g/in³ to about 2.5 g/in³, or in the range of about 0.5 g/in³ to about 2 g/in³.

In various embodiments, an oxidation catalyst 45 may be disposed within at least a portion of the length of the plurality of porous walls 13, and/or on at least a length of the of the surface of the walls 13 of the outlet passages 26 extending from the outlet end 16 for less than the axial length '$L_w$' of the wall flow filter walls.

According to one or more embodiments, it will be appreciated that the oxidation catalyst 45 may be on the walls 13 as opposed to permeating the walls, however, a portion of the oxidation catalyst 45 may penetrate a depth into the wall(s) 13 less than the thickness of the wall(s) 13, but the majority of the oxidation catalyst 45 is on or upon the wall, and not embedded in the wall.

Figure 5:
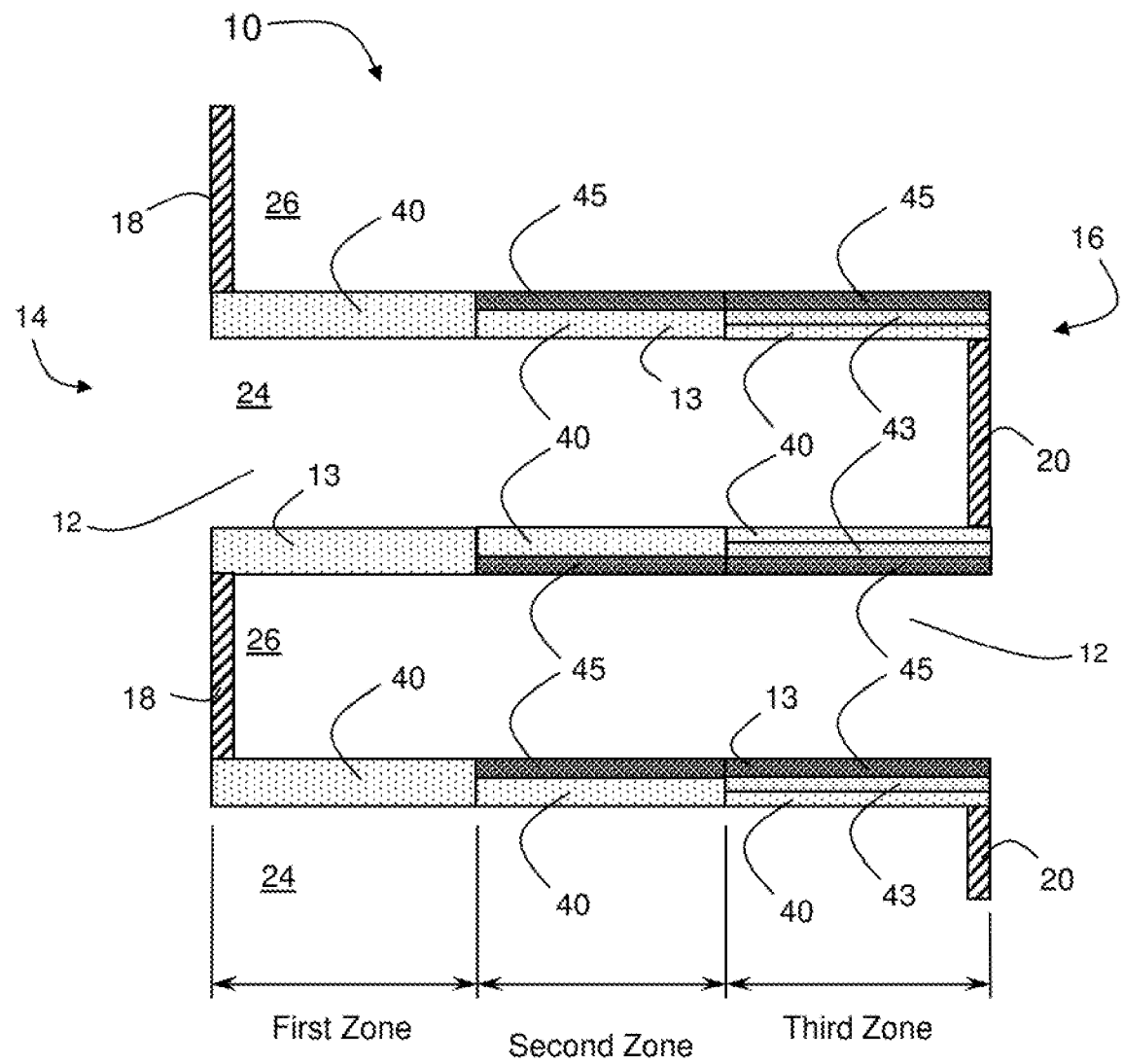
FIG. 5 illustrates a magnified view of a cross-section of another exemplary embodiment of a plurality of porous walls of a wall flow filter substrate having a plurality of zones formed by a plurality of coatings.

FIG. 5 illustrates a magnified view of a cross-section of another exemplary embodiment of a plurality of porous walls of a wall flow filter substrate having a plurality of zones formed by a plurality of coatings.

In one or more embodiments, at least three catalytic zones are formed along the length '$L_w$' of the porous walls 13, and permeating the thickness of the porous walls 13. In one or more embodiments, a first zone 30 may extend axially from the inlet end 14 of the porous wall 13, where the first zone may extend a distance from the inlet end 14 of the porous wall 13 less than the full length of the porous wall 13. In various embodiments, the first zone 30 may comprise a first selective catalytic reduction (SCR) catalyst 40 at a first loading. In one or more embodiments, an SCR catalyst composition may be disposed within at least a portion of the length of the plurality of porous walls 13 and permeate through the porous wall(s) over about 1% to about 98% of the wall length. In various embodiments, the first selective catalytic reduction catalyst first loading may be in the range of about 0.5 g/in³ to about 3 g/in³, or in the range of about 0.5 g/in³ to about 2.5 g/in³, or in the range of about 0.5 g/in³ to about 2 g/in³.

In one or more embodiments, a second zone 32 downstream of the first zone 30 may extend axially at least a portion of the length of the plurality of porous walls 13, where the second zone may extend a distance from the first zone less than the length of the porous walls 13 to the outlet end 16 of the porous walls 13. In various embodiments, the second zone 32 may comprise a first selective catalytic reduction catalyst 40 at a first loading and a platinum group metal oxidation catalyst 45 at a first loading 46. In various embodiments, the second zone 32 may comprise a second selective catalytic reduction catalyst 43 at a second loading and a platinum group metal oxidation catalyst 45 at a first loading 46. In various embodiments, the second selective catalytic reduction catalyst second loading may be in the range of about 0.5 g/in³ to about 3 g/in³, or in the range of about 0.5 g/in³ to about 2.5 g/in³, or in the range of about 0.5 g/in³ to about 2 g/in³. In various embodiments, the selective catalytic reduction catalyst second loading may be in the range of about 0.5 g/in³ to about 3 g/in³, or in the range of about 0.5 g/in³ to about 2.5 g/in³, or in the range of about 0.5 g/in³ to about 2 g/in³. In various embodiments, the second SCR loading may be in an amount that is the same as or different from the first SCR loading 42. In various embodiments, the platinum group metal oxidation catalyst first loading 46 may be in the range of about 0.5 g/ft³ to about 50 g/ft³, or in the range of about 1.0 g/ft³ to about 10 g/ft³, or in the range of about 2.5 g/ft³ to about 5 g/ft³.

In one or more embodiments, a third zone 34 downstream of the second zone 32 may extend the length of the porous walls 13 from the second zone 32 to the outlet end of the porous walls 13. In various embodiments, the third zone 34 may comprise a first selective catalytic reduction catalyst 40 at one of the first loading and the second selective catalytic reduction catalyst 43 at a second loading, and the platinum group metal oxidation catalyst 45 at the first loading 46. In one or more embodiments, an SCR catalyst composition may be disposed within at least a portion of the length of the plurality of porous walls 13 and permeate through the porous wall over about 1% to about 98% of the wall length. In various embodiments, the selective catalytic reduction catalyst second loading 42 may be in the range of about 0.5 g/in³ to about 3 g/in³, or in the range of about 0.5 g/in³ to about 2.5 g/in³, or in the range of about 0.5 g/in³ to about 2 g/in³.

Figure 6:
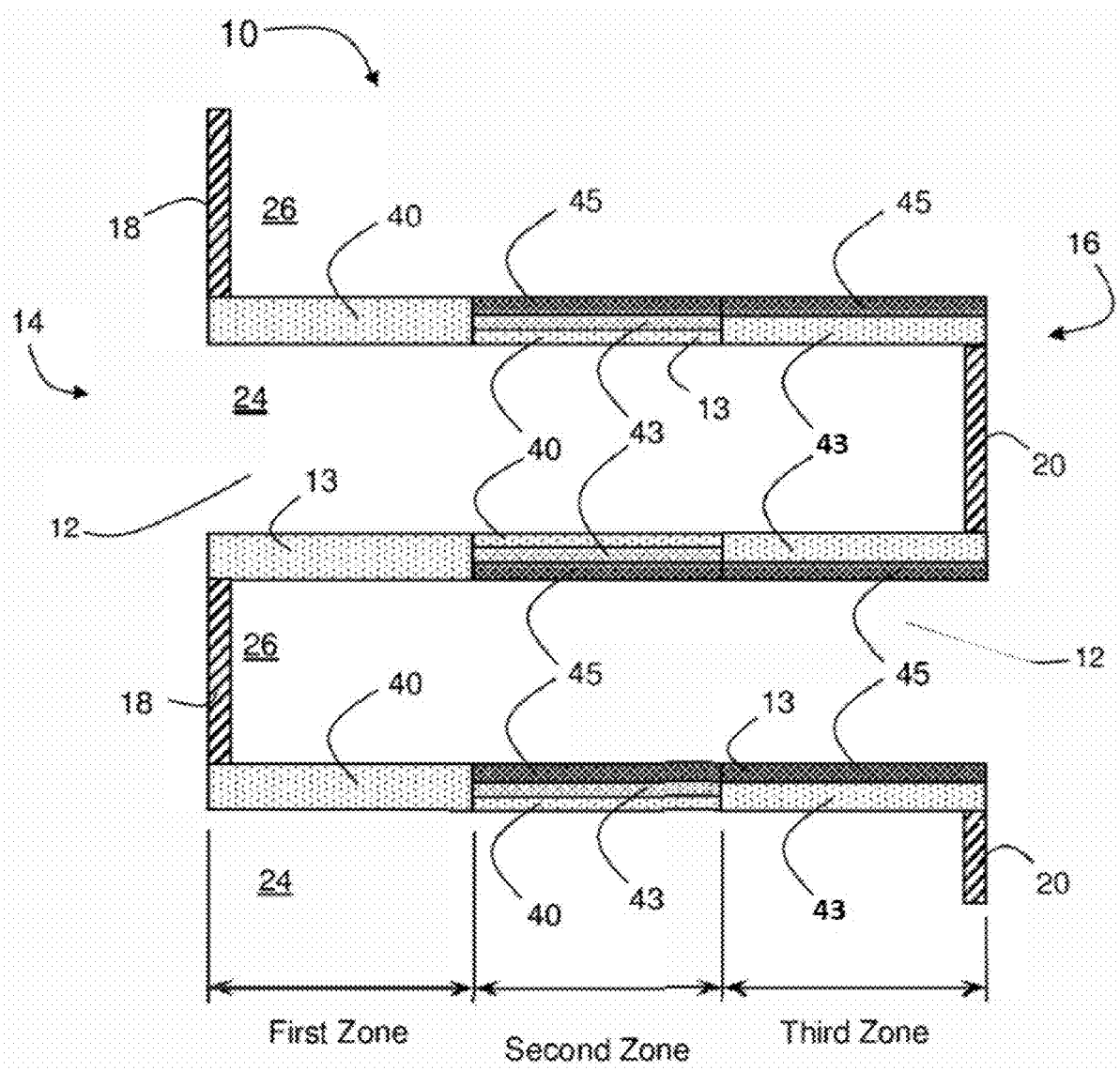
FIG. 6 illustrates a magnified view of a cross-section of another exemplary embodiment of a plurality of porous walls of a wall flow filter substrate having a plurality of zones formed by another arrangement of a plurality of coatings.

FIG. 6 illustrates a magnified view of a cross-section of another exemplary embodiment of a plurality of porous walls of a wall flow filter substrate having a plurality of zones formed by another arrangement of a plurality of coatings.

In one or more embodiments, at least three catalytic zones are formed along the length '$L_w$' of the porous walls 13, and permeating the thickness of the porous walls 13. In one or more embodiments, a first zone 30 may extend axially from the inlet end 14 of the porous wall 13, where the first zone may extend a distance from the inlet end 14 of the porous wall 13 less than the full length of the porous wall 13. In various embodiments, the first zone 30 may comprise a first selective catalytic reduction (SCR) catalyst 40 at a first loading. In one or more embodiments, an SCR catalyst composition may be disposed within at least a portion of the length of the plurality of porous walls 13 and permeate through the porous wall(s) over about 1% to about 98% of the wall length. In various embodiments, the first selective catalytic reduction catalyst first loading may be in the range of about 0.5 g/in³ to about 3 g/in³, or in the range of about 0.5 g/in³ to about 2.5 g/in³, or in the range of about 1.0 g/in³ to about 2.0 g/in³.

In one or more embodiments, a second zone 32 downstream of the first zone 30 may extend the length of the porous walls 13 from the first zone less than the length of the porous walls 13 to the outlet end 16 of the porous walls 13. In various embodiments, the second zone 32 may comprise a first selective catalytic reduction catalyst 40 at one of the first loading and the second selective catalytic reduction catalyst 43 at a second loading, and the platinum group metal oxidation catalyst 45 at the first loading 46. In one or more embodiments, an SCR catalyst composition may be disposed within at least a portion of the length of the plurality of porous walls 13 and permeate through the porous wall over about 1% to about 98% of the wall length. In various embodiments, the second selective catalytic reduction catalyst 43 at a first loading may be in the range of about 0.3 g/in³ to about 3 g/in³, or in the range of about 0.4 g/in³ to about 2.5 g/in³, or in the range of about 0.5 g/in³ to about 2 g/in³.

In one or more embodiments, a third zone 34 downstream of the second zone 32 may extend the length of the porous walls 13 from the second zone 32 to the outlet end of the porous walls 13. In various embodiments, the third zone 34 may comprise a second selective catalytic reduction catalyst 43 at a second loading, and the platinum group metal oxidation catalyst 45 at the first loading 46. In one or more embodiments, an SCR catalyst composition may be disposed within at least a portion of the length of the plurality of porous walls 13 and permeate through the porous wall over about 1% to about 98% of the wall length. In various embodiments, the second selective catalytic reduction catalyst 43 first loading may be in the range of about 0.3 g/in$^3$ to about 3 g/in$^3$, or in the range of about 0.4 g/in$^3$ to about 2.5 g/in$^3$, or in the range of about 0.5 g/in$^3$ to about 2 g/in$^3$, or in the range of about 0.5 g/in$^3$ to about 3 g/in$^3$.

In one or more embodiments, the composition of the first selective catalytic reduction catalyst 40 and the second selective catalytic reduction catalyst 43 may be the same or different, for example, the first selective catalytic reduction catalyst 40 composition may be Cu-CHA at a first loading of about 2.5 g/in$^3$, and the second selective catalytic reduction catalyst 43 composition may be Fe-ZSM-5 at a first loading of about 2.0 g/in$^3$. In another example, the first selective catalytic reduction catalyst 40 composition may be Cu-CHA at a first loading of about 3.0 g/in$^3$, and the second selective catalytic reduction catalyst 43 composition may be Cu-CHA at a first loading of about 2.0 g/in$^3$.

Figure 7:
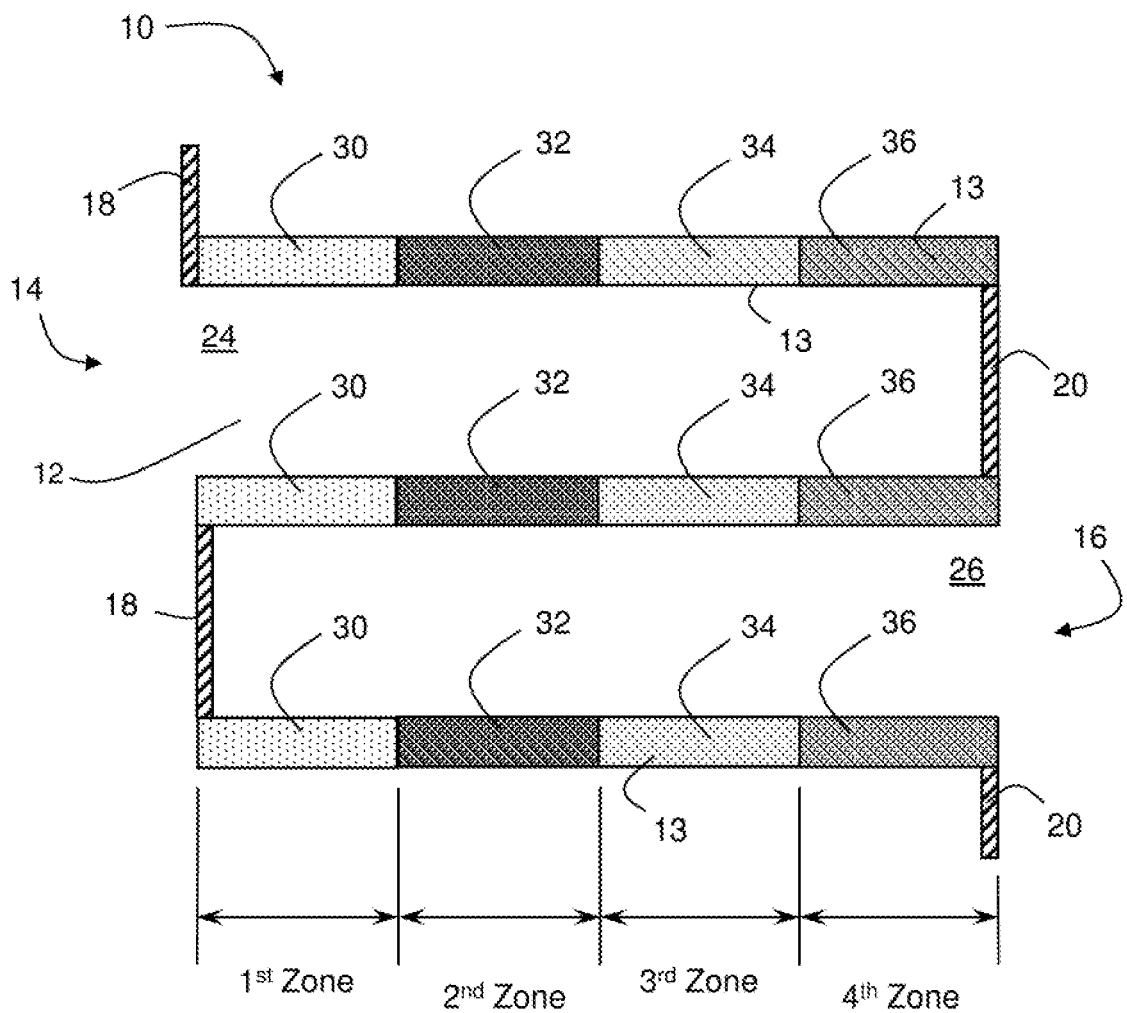
FIG. 7 illustrates a magnified view of a cross-section of an exemplary embodiment of a plurality of porous walls of a wall flow filter substrate depicting four zones.

FIG. 7 illustrates a magnified view of a cross-section of an exemplary embodiment of a plurality of porous walls of a wall flow filter substrate depicting four zones. In one or more embodiments, at least four catalytic zones are formed by at least three catalytic coatings along the length 'L$_w$' of the porous walls 13.

In one or more embodiments, a first zone 30 extends axially from the inlet end 14 of the porous walls 13 a distance less than the full length of the porous wall 13, a second zone 32 extends axially from the first zone 30 a distance less than the distance to the outlet end 16 of the porous wall(s) 13, a third zone 34 extends axially from the second zone 32 a distance less than the distance to the outlet end 16 of the porous wall(s) 13, and a fourth zone 36 extends axially from the third zone 34 to the outlet end 16 of the porous wall(s) 13. In various embodiments, the at least three catalytic coatings are disposed along the length 'L$_w$' of the porous walls 13 in different spatial arrangements. In various embodiments, four catalytic coatings are disposed along the length 'L$_w$' of the porous walls 13 in different spatial arrangements.

In various embodiments, the first zone consists essentially of the first SCR catalyst coating; and the second zone comprises the platinum group metal coating, and the first or the second SCR catalyst coating. In various embodiments, the platinum group metal is present in the second zone at a loading in the range of about 1 g/ft$^3$ to about 50 g/ft$^3$.

In various embodiments, the third zone consists essentially of the first SCR catalyst coating, the second SCR catalyst coating, and the platinum group metal coating; and the fourth zone comprises the platinum group metal coating and the second SCR catalyst coating. In various embodiments, the platinum group metal is present in the third and fourth zones at a loading in the range of about 1 g/ft$^3$ to about 50 g/ft$^3$.

In various embodiments, a first zone 30 may extend from the inlet end 14 of the wall 13, and is upstream of subsequent zones. In various embodiments, the first zone 30 may comprise a selective catalytic reduction catalyst 40 at a first loading. In one or more embodiments, an SCR catalyst composition may be disposed within at least a portion of the length of the plurality of porous walls 13 and permeate through the porous wall over that portion of the wall length.

In one or more embodiments, a second zone 32 downstream of the first zone 30 may extend at least a portion of the length of the plurality of porous walls 13 from the first zone and less than the full length of the walls 13 to the outlet end 16 of the porous walls 13. In various embodiments, the second zone 32 may comprise a selective catalytic reduction catalyst 40 at a first loading and a platinum group metal oxidation catalyst 45 at a first loading 46, or a selective catalytic reduction catalyst 40 at a second loading 42 and a platinum group metal oxidation catalyst 45 at a first loading 46. In various embodiments, the second loading may be in an amount that is the same as or different from the first loading.

In one or more embodiments, a third zone 34 downstream of the second zone 32 may extend at least a portion of the length of the plurality of porous walls 13 from the second zone, and less than the length of the wall 13 to the outlet end 16 of the porous walls 13. In various embodiments, the third zone 34 may comprise a first selective catalytic reduction catalyst at one of the first loading and/or the second loading 42, and the platinum group metal oxidation catalyst 45 at the first loading 46. In various embodiments, the third zone 34 may comprise a first selective catalytic reduction catalyst at a first loading and a platinum group metal oxidation catalyst 45 at a first loading 46, or a selective catalytic reduction catalyst at a second loading 42 and a platinum group metal oxidation catalyst 45 at a first loading 46. In various embodiments, the second loading 42 may be in an amount that is the same as or different from the first loading.

According to one or more embodiments, it will be appreciated that the oxidation catalyst 45 may be on the walls 13 in the third zone as opposed to permeating the walls, however, a portion of the oxidation catalyst 45 may penetrate a depth into the wall(s) 13 less than the thickness of the wall(s) 13, but the majority of the oxidation catalyst is on or upon the wall, and not embedded within the wall.

In one or more embodiments, a fourth zone 36 downstream of the third zone 34 may extend the length of the porous walls 13 from the third zone 34 to the outlet end of the porous walls 13. In various embodiments, the fourth zone 34 may comprise a selective catalytic reduction catalyst 40 at one of the first loading and/or the second loading 42, and the platinum group metal oxidation catalyst 45 at the first loading 46.

In one or more embodiments, a first zone 30 may extend axially from the inlet end 14 of the porous wall 13, where the first zone may extend a distance from the inlet end 14 of the of the porous wall 13 less than the full length of the porous wall 13. In various embodiments, the first zone 30 may comprise a first selective catalytic reduction (SCR) catalyst 40 at a first loading. In one or more embodiments, an SCR catalyst composition may be disposed within at least a portion of the length of the plurality of porous walls 13 and permeate through the porous wall over about 1% to about 97% of the wall length. In various embodiments, the first selective catalytic reduction catalyst first loading may be in the range of about 0.5 g/in$^3$ to about 3 g/in$^3$.

In one or more embodiments, at least one catalytic coating permeates the thickness of the porous walls 13. In various embodiments, a first SCR catalytic coating permeates the thickness of the porous walls 13, wherein the SCR catalytic coating permeates at least a first zone. In various embodiments, a first SCR catalytic coating and a first PGM catalytic coating a permeates the thickness of the porous walls 13, wherein the SCR catalytic coating and PGM catalytic coating permeates at least a second zone.

Figure 8:
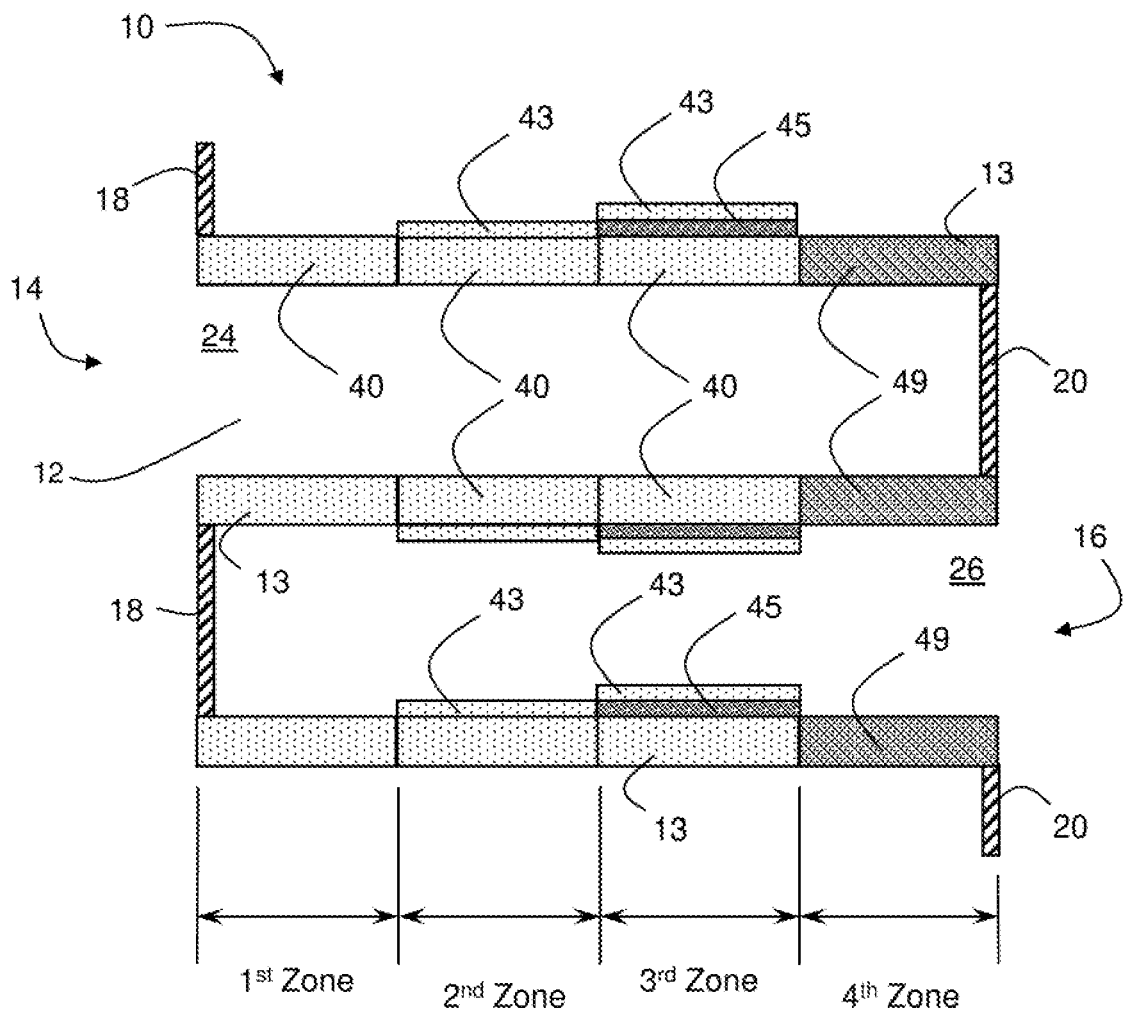
FIG. 8 illustrates a magnified view of a cross-section of another exemplary embodiment of a plurality of porous walls of a wall flow filter substrate having four zones formed by at least three coatings.

FIG. 8 illustrates a magnified view of a cross-section of another exemplary embodiment of a plurality of porous walls of a wall flow filter substrate having four zones formed by at least three coatings.

In one or more embodiments, a first zone extends axially from the inlet end of the porous walls a distance less than the full length of the porous wall 13 and consists essentially of the first SCR catalyst coating 40; and a second zone extends axially from the first zone a distance less than the distance to the outlet end of the porous wall an comprises the first SCR catalyst coating 40 and the second SCR catalyst coating 43; and a third zone extends axially from the second zone a distance less than the distance to the outlet end of the porous wall and consists essentially of the first SCR catalyst coating 40, the second SCR catalyst coating 43, and the platinum group metal coating 45; and the fourth zone extends axially from the third zone to the outlet end of the porous wall and comprises a combination or mixture 49 of the platinum group metal coating 45 and the second SCR catalyst coating 43. In various embodiments, the combination 49 may be formed by introducing the second SCR catalyst and oxidation catalyst particles sequentially into the outlet end of the particulate filter channels.

Figure 9:
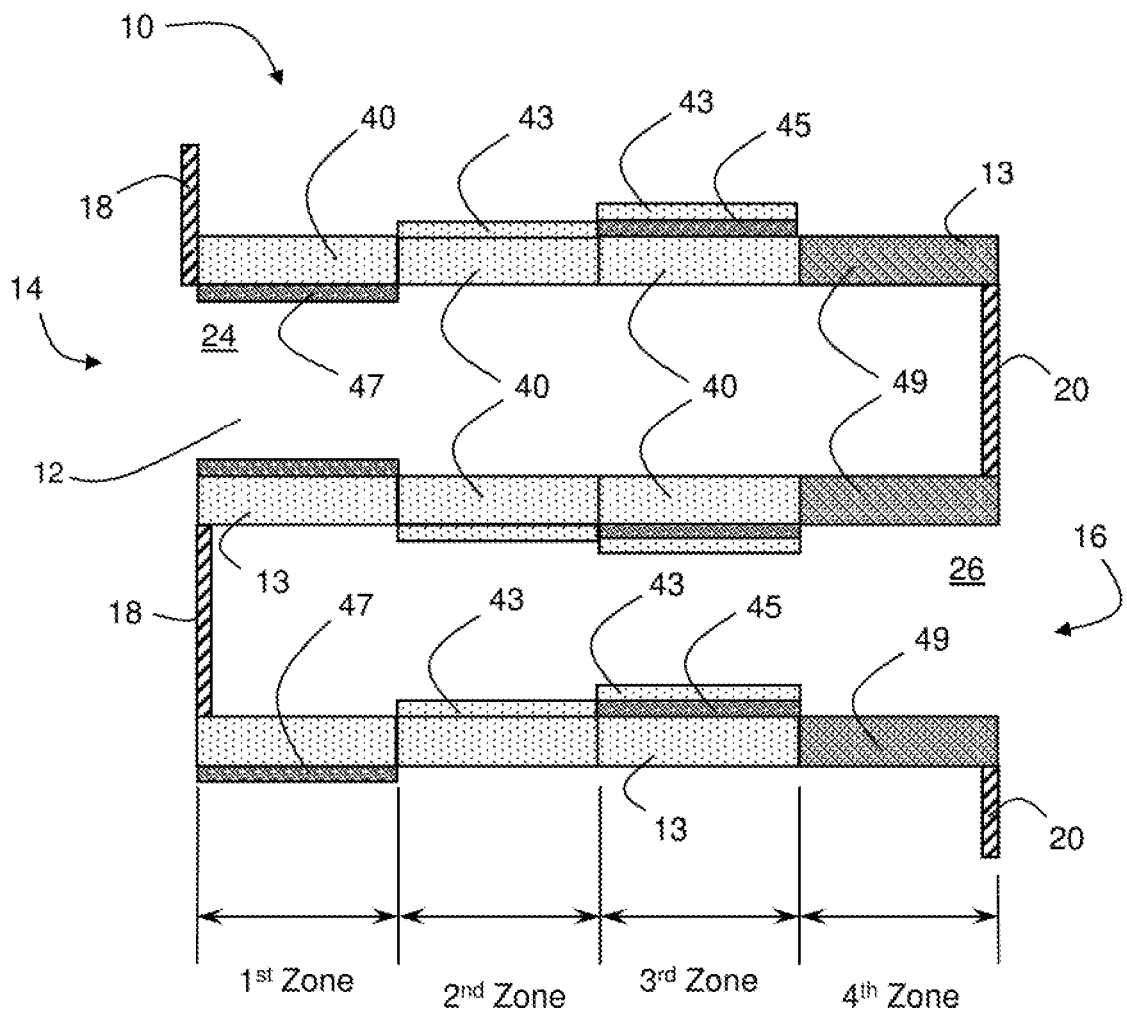
FIG. 9 illustrates a magnified view of a cross-section of another exemplary embodiment of a plurality of porous walls of a wall flow filter substrate having four zones formed by four coatings.

FIG. 9 illustrates a magnified view of a cross-section of another exemplary embodiment of a plurality of porous walls of a wall flow filter substrate having one or more catalyst(s) on the surface of the walls in one or more zones, where the catalysts may form sandwiched layers.

In one or more embodiments, the catalyzed particulate filter 10 may comprise three catalytic zones or four catalytic zones. In various embodiments, the first zone may comprise a first SCR catalyst 40 at a first loading that permeates a length of the porous walls in the range of about 5% to about 50% of the wall length extending from the inlet end of the passages, and an oxidative catalyst 47 at a first loading 48 that coats the surface of the walls in the first zone. A second zone may comprise a first SCR catalyst 40 at a first loading that permeates a length of the porous walls in the range of about 5% to about 50% of the wall length extending from the first zone, where the first zone ends at the interface where the second zone begins, and a second selective catalytic reduction catalyst 43 at a first loading that coats the surface of the walls in the second zone extending from the first zone upstream from the second zone. A third zone may comprise a first SCR catalyst 40 at a first loading that permeates a length of the porous walls in the range of about 5% to about 50% of the wall length extending from the second zone, an oxidative catalyst 45 at a first loading 46 that coats the surface of the walls in the third zone, and a second selective catalytic reduction catalyst 43 at a first loading that covers the oxidation catalyst 45. A fourth zone may comprise a combination 49 of catalyst compositions including an oxidative catalyst 45 at a first loading 46 and a second SCR catalyst 43 at a first loading that permeates a length of the porous walls in the range of about 5% to about 50% of the wall length extending from the third zone to the outlet end, where the third zone ends at the interface where the fourth zone begins, and an oxidative catalyst at a first loading 46 that permeates the walls in the fourth zone extending from the third zone to the outlet, where the oxidation catalyst is interspersed with the SCR catalyst within the porous walls.

In various embodiments, the catalyzed particulate filter may comprise more than four catalytic zones by reducing the length of one or more of the four individual zones, and/or incorporating additional catalytic material as additional coatings applied from the filter inlet into the porous walls and/or on the walls surfaces. In various embodiments, the additional zones may be downstream of the fourth zone.

Figure 10:
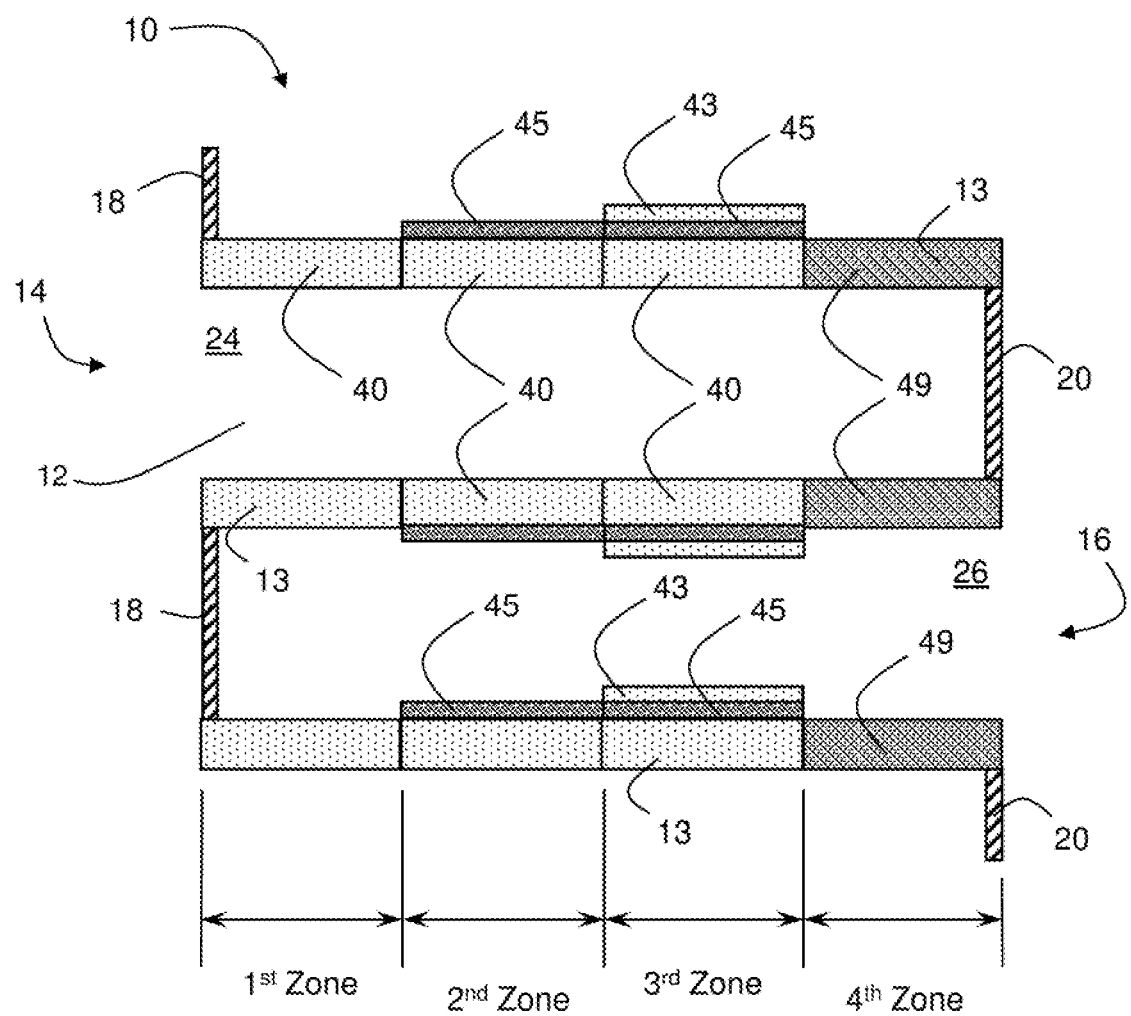
FIG. 10 illustrates a magnified view of a cross-section of another exemplary embodiment of a plurality of porous walls of a wall flow filter substrate having four zones formed by at least three coatings.

FIG. 10 illustrates a magnified view of a cross-section of an exemplary embodiment of a plurality of porous walls of a wall flow filter substrate having a catalyst at least on the surface of the walls in a zone, where the catalysts may form sandwiched layers.

In one or more embodiments, the catalyzed particulate filter 10 may comprise four catalytic zones. In various embodiments, the first zone may comprise a first SCR catalyst 40 at a first loading that permeates a length of the porous walls in the range of about 5% to about 50% of the wall length extending from the inlet end of the passages. A second zone may comprise a first SCR catalyst 40 at a first loading that permeates a length of the porous walls in the range of about 5% to about 50% of the wall length extending from the first zone, where the first zone ends at the interface where the second zone begins, and an oxidative catalyst 45 at a first loading 46 that coats the surface of the walls in the second zone extending from the first zone upstream from the second zone. A third zone may comprise a first SCR catalyst 40 at a first loading that permeates a length of the porous walls in the range of about 5% to about 50% of the wall length extending from the second zone, an oxidative catalyst 45 at a first loading 46 that coats the surface of the walls in the third zone, and a second selective catalytic reduction catalyst 43 at a first loading that covers the oxidation catalyst 45, wherein the oxidative catalyst 45 is sandwiched between the first SCR catalyst 40 and the second SCR catalyst 43. A fourth zone may comprise a combination 49 of catalyst compositions including an oxidative catalyst 45 at a first loading 46 and a second SCR catalyst 43 at a first loading that permeates a length of the porous walls in the range of about 5% to about 50% of the wall length extending from the third zone to the outlet end, where the third zone ends at the interface where the fourth zone begins, and an oxidative catalyst at a first loading 46 that permeates the walls in the fourth zone extending from the third zone to the outlet, where the oxidation catalyst is interspersed with the SCR catalyst within the porous walls. In various embodiments, the combination 49 may be formed by a mixed slurry of SCR and oxidation catalyst particles introduced into the outlet end of the particulate filter channels.

Figure 11:
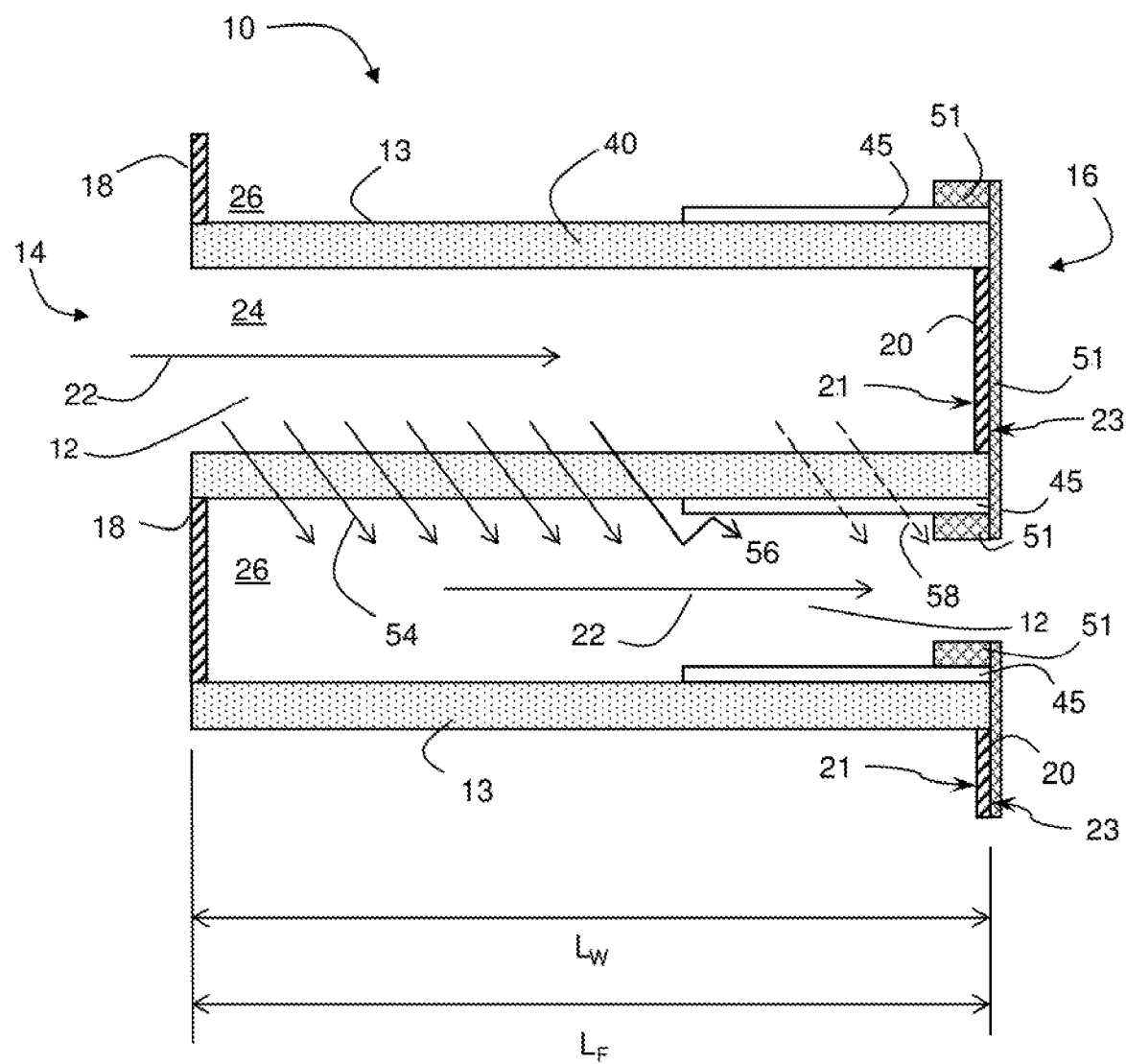
FIG. 11 illustrates a magnified view of a cross-section of another exemplary embodiment of a plurality of porous walls of a wall flow filter substrate having a plurality of zones formed by a plurality of coatings.

FIG. 11 illustrates a magnified view of a cross-section of another exemplary embodiment of a plurality of porous walls of a wall flow filter substrate having a catalyst at least on the surface of the walls of a front zone.

In one or more embodiments, an exhaust gas stream 22 enters the inlet passages 24 and flows toward the outlet end 16 of the wall flow filter 10. The gas can take multiple paths 54,56,58 through the filter 10, including passing through 54 the porous walls 13 from the inlet passages 24 to the outlet passages 26, where it can exit via the outlet end 16 of the filter. In another flow pathway 56, some of the exhaust gas 22 can follow pathway 54 through the porous filter wall 13 containing the SCR catalyst 40 and then contact the oxidation catalyst 45 as it exits the filter. For another alternative pathway 58, some of the exhaust gas 22 can diffuse through the porous wall 13 containing the SCR catalyst 40 and through the oxidation catalyst 45.

One or more embodiments comprise a plug coating on the exterior surface 23 of a plug 20 at the closed outlet end of the inlet passages 24, wherein the plug coating comprises a platinum group metal, and where the plug coating may wrap around the corner of the porous walls. In one or more embodiments, a platinum group metal coating 51 may be coated onto the interior surface of the outlet passages 26 near the outlet 16 of the parallel passages. In one or more embodiments, the platinum group metal coating 51 may extend into the outlet end of the outlet passages 26 5% or less of the wall length, or 3% or less of the wall length, or 1% or less of the wall length. In various embodiments, the platinum group metal coating 51 may extend into the outlet end of the outlet passages 26 a length in the range of about 1 mm to about 2.5 mm.

Figure 12:
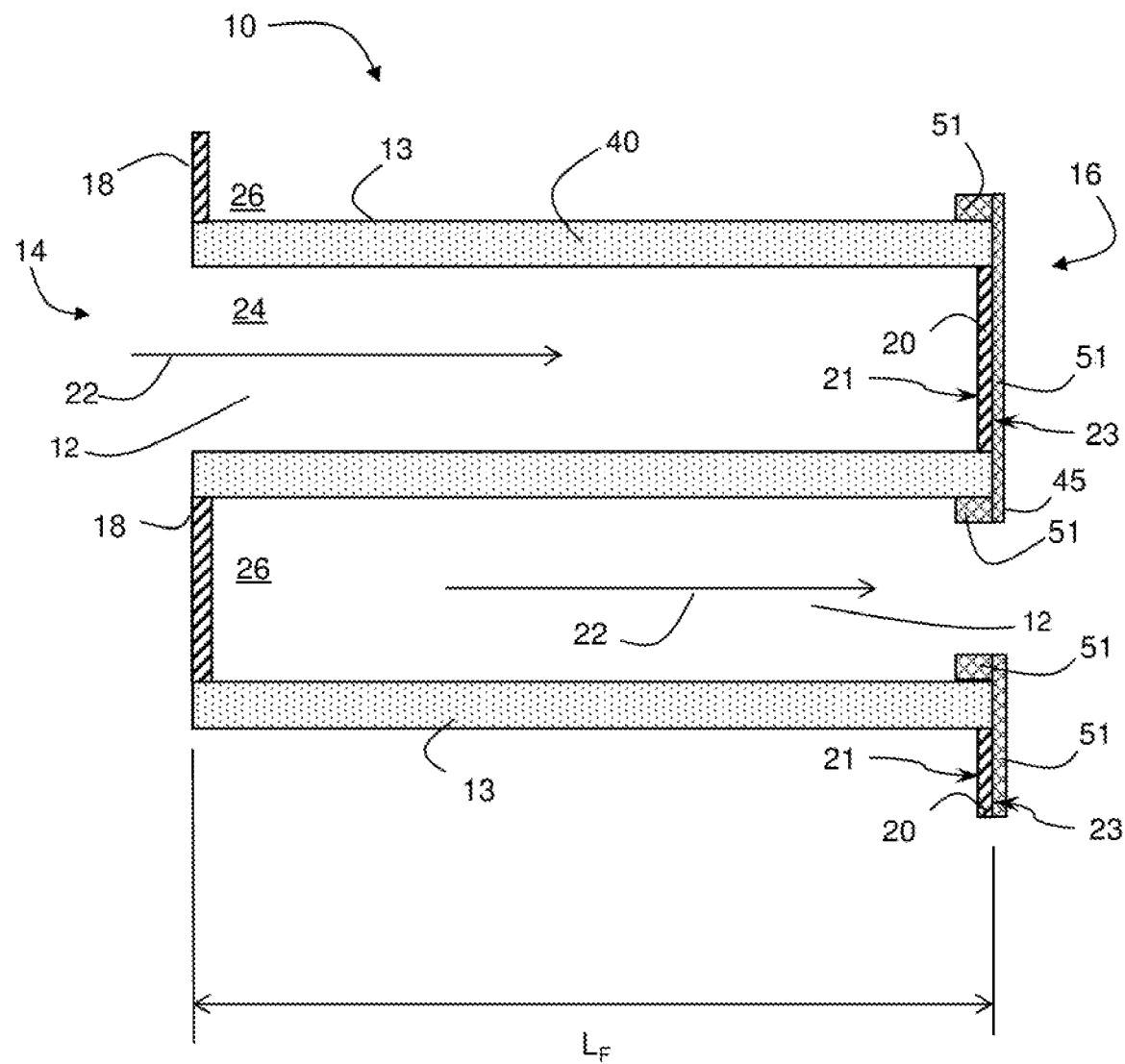
FIG. 12 illustrates a magnified view of a cross-section of another exemplary embodiment of a plurality of porous walls of a wall flow filter substrate having a plug coating on the exterior surface of the outlet plugs.

FIG. 12 illustrates a magnified view of a cross-section of another exemplary embodiment of a plurality of porous walls of a wall flow filter substrate having a plug coating on the exterior surface of the outlet plugs.

In one or more embodiments, the porous filter wall 13 containing the SCR catalyst 40 may have one or more additional coatings impregnated into the porous filter wall 13 and/or coated onto the surface of the porous filter wall 13, as described herein, and may further comprise a plug coating on the exterior surface 23 of a plug 20 at the closed outlet end of the inlet passages 24, wherein the plug coating comprises a platinum group metal, and where the plug coating may wrap around the corner of the porous walls.

Figure 13:
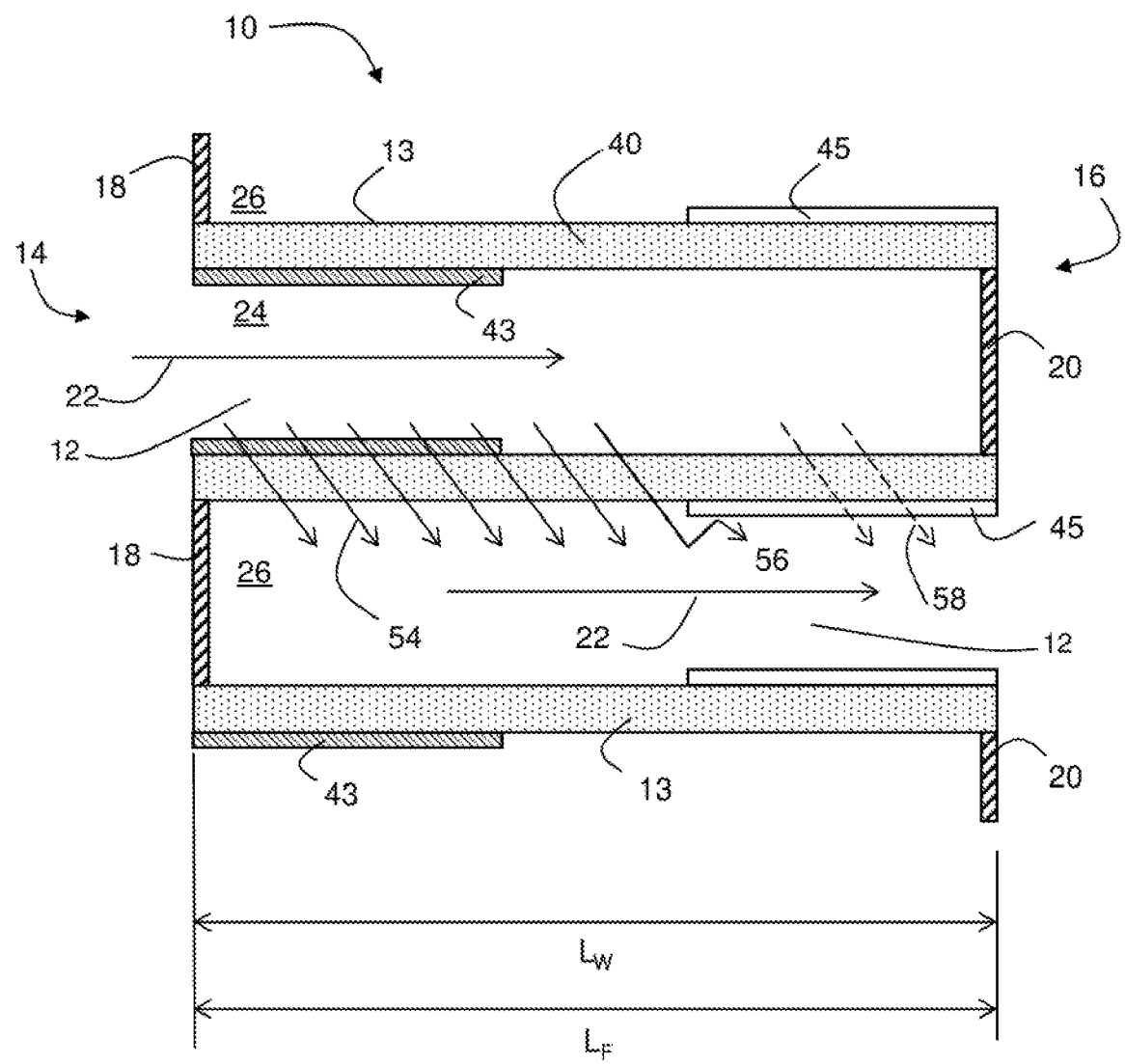
FIG. 13 illustrates a magnified view of a cross-section of another exemplary embodiment of a plurality of porous walls of a wall flow filter substrate having a plurality of zones formed by a plurality of coatings.

FIG. 13 illustrates a magnified view of a cross-section of another exemplary embodiment of a plurality of porous walls of a wall flow filter substrate having a plurality of zones formed by a plurality of coatings, wherein at least some catalytic coatings may be on the surface of the porous walls of the wall flow filter.

In one or more embodiments, an exhaust gas stream 22 enters the inlet passages 24 and flows toward the outlet end 16 of the wall flow filter 10. The gas can take multiple paths 54,56,58 through the filter 10, including passing through 54 the porous walls 13 from the inlet passages 24 to the outlet passages 26, where it can exit via the outlet end 16 of the filter. In a particular flow pathway 54, the exhaust gas can flow through the second SCR catalyst 43 on the inlet-side surface of the porous walls 13 and through the first SCR catalyst 40 impregnated into the porous walls 13. In another flow pathway 56, some of the exhaust gas 22 can follow pathway 54 through the porous filter wall 13 containing the SCR catalyst 40 and then contact the oxidation catalyst 45 on the outlet-side surface of the porous filter walls 13 as it exits the filter. For another alternative pathway 58, some of the exhaust gas 22 can diffuse through the porous wall 13 containing the SCR catalyst 40 and through the oxidation catalyst 45.

In one or more embodiments, each of the catalytic components permeates the porous walls of the catalytic substrate and are interspersed within the walls. In various embodiments, the SCR catalyst is intermixed with the PGM catalyst within the porous walls. In various embodiments, the SCR catalyst permeates the porous walls and the majority of PGM catalyst resides on the surface of the SCR impregnated porous walls. In various embodiments, the majority of PGM catalyst resides on the surface of the SCR impregnated porous walls and is sandwiched between the SCR catalyst permeated porous walls and an overlayer of SCR catalyst.

In various embodiments, the platinum group metal coating in the second zone is on the surface of the porous walls; and the platinum group metal coating in the third zone is sandwiched between the first SCR catalyst coating and the second SCR catalyst coating.

Figure 14:
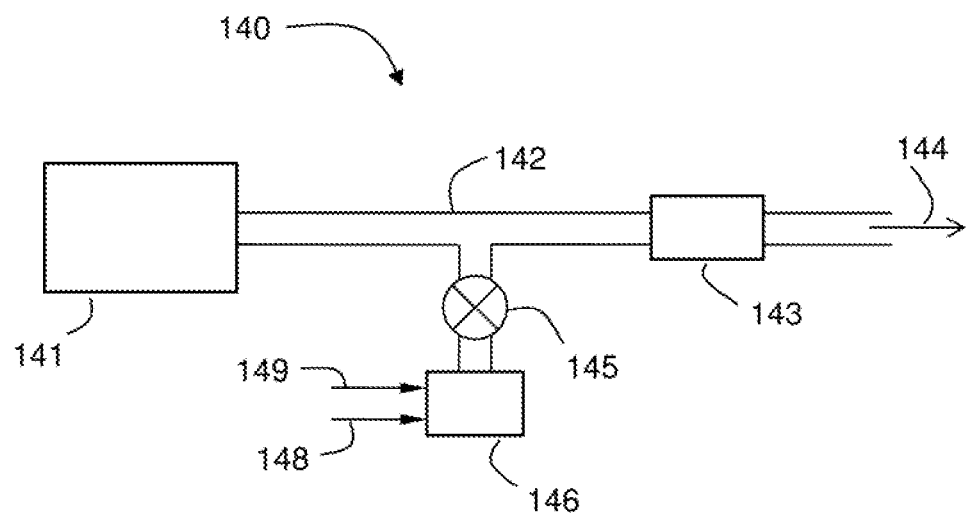
FIG. 14 illustrates an exemplary embodiment of an engine system comprising an emission treatment system and a urea injector.

FIG. 14 illustrates an exemplary embodiment of an engine system comprising an emission treatment system 140 and a urea injector comprising an ammonia precursor feed line 148, an air feed line 149, and a mixing station 146 connected to an in fluid communication with the emission treatment system. As can be seen in FIG. 14, the exhaust containing gaseous pollutants (including unburned hydrocarbons, carbon monoxide and NOx) and particulate matter is conveyed from the engine 141 through a connector 142 to a catalyzed particulate filter 143, as described herein. After the catalyzed particulate filter 143, the exhaust gas exits the system via the tailpipe 144. Downstream of engine 141 a reductant, for example urea, may be injected as a spray via a nozzle (not shown) into the exhaust stream. Aqueous urea shown on one line 148 may serve as the ammonia precursor which can be mixed with air on another line 149 in a mixing station 146. Valve 145 can be used to meter precise amounts of aqueous urea which are converted in the exhaust stream to ammonia. The exhaust stream with the added ammonia is conveyed to the multifunctional, catalyzed particulate filter 143, where the $NH_3$ can interact with an SCR catalyst.

The connector 142 may not be required when no additional components are used before the catalyzed particulate filter 143. In these embodiments, the catalyzed particulate filter 143 is coupled directly to the engine 141. The distance between the engine and catalyst can be quite short resulting in a so-called "close coupled" catalytic arrangement. Alternatively, the distance from the engine to the catalyst can be longer, resulting in an "underfloor" configuration.

Figure 15:
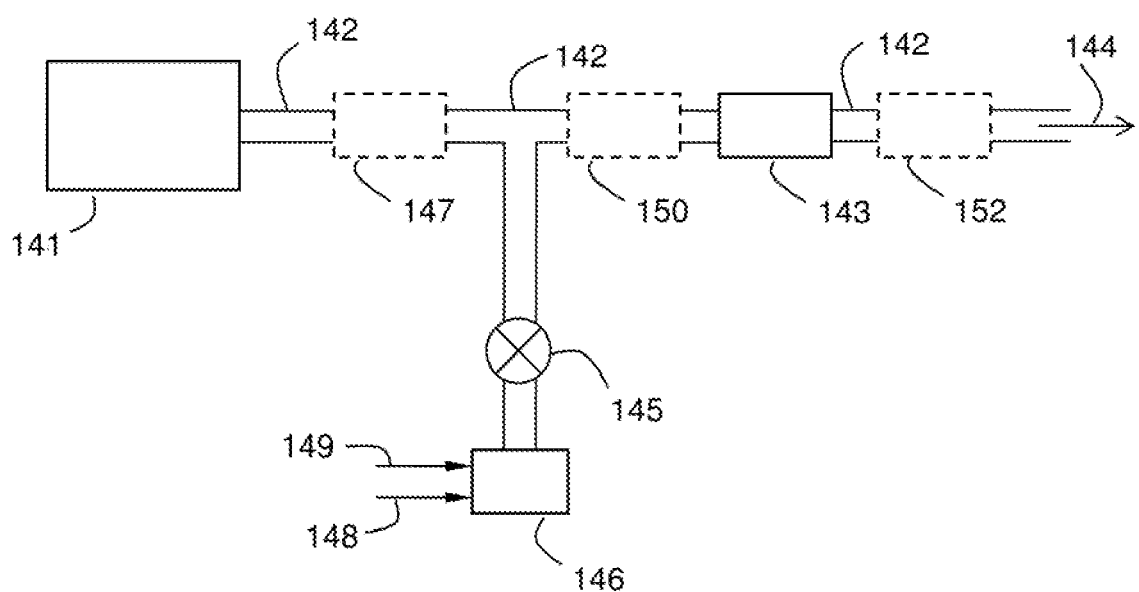
FIG. 15 illustrates another exemplary embodiment of an engine system comprising an emission treatment system, a urea injector, and other engine components.

FIG. 15 illustrates another exemplary embodiment of an engine system comprising an emission treatment system, a urea injector, and other engine components. As shown in FIG. 15, some embodiments of the treatment system include one or more separate components 147. These optional components 147 can include one or more of a diesel oxidation catalyst, lean NOx trap, partial NOx adsorber or three-way catalyst. Depending on the desired level of NOx removal, additional SCR catalyst 150 can be disposed upstream of the multifunctional catalyzed particulate filter 143. For example, the additional SCR catalyst may be disposed on a monolithic, honeycomb flow through substrate or ceramic foam substrate upstream of the soot filter. Depending on the desired level of NOx removal, additional SCR catalyst 152 can be disposed downstream of the multifunctional catalyzed particulate filter 143, and may also contain an additional AMOx catalyst. Even in these various embodiments, the use of the multifunctional coated SCR soot filter still achieves a reduction in the total volume of catalyst required to meet NOx reduction goals. Depending on the desired level of hydrocarbon removal, additional oxidation catalysts can be disposed upstream of exhaust component 147 or downstream with exhaust component 152. In various embodiments, an oxidation catalyst would not be provided with component 150, because this would also oxidize the injected urea to NOx.

Catalyst Examples

The disclosed non-limiting examples illustrate particular spatial arrangements and loadings of catalytic material(s) on a catalytic substrate. It is to be understood that the invention is not limited to the recited arrangements, details of construction, or process steps set forth in the following description of the examples, and that the invention is capable of other embodiments and of being practiced or being carried out in various ways.

Non-limiting Examples 1 to 7 are summarized in Table 1. The blank filter substrate is a SiC filter segment (34 mm×34 mm×150 mm) with 63% porosity and a mean pore size of 23 μm. The SCR catalyst is copper exchanged chabazite zeolite (Cu-CHA) with CuO loading of 3.25% and $SiO_2/Al_2O_3$ molar ratio of 30.

TABLE 1

Catalyzed Filter Design for Examples 1 to 7

| Sample ID | First coat | Second coat | Third coat |
|---|---|---|---|
| 1 | 1.0 g/in³ Cu-CHA Coat from inlet Coverage: 100% | None | None |
| 2 | 5.0 g/ft³ Pt Coat from outlet Coverage: 50% | 1.0 g/in³ Cu-CHA Coat from inlet Coverage: 100% | None |

TABLE 1-continued

Catalyzed Filter Design for Examples 1 to 7

| Sample ID | First coat | Second coat | Third coat |
|---|---|---|---|
| 3 | 2.5 g/ft$^3$ Pt<br>Coat from outlet<br>Coverage: 33% | 1.0 g/in$^3$ Cu-CHA<br>Coat from inlet<br>Coverage: 100% | None |
| 4 | 2.5 g/ft$^3$ Pt<br>Coat from outlet<br>Coverage: 67% | 1.0 g/in$^3$ Cu-CHA<br>Coat from inlet<br>Coverage: 100% | None |
| 5 | 5.0 g/ft$^3$ Pt<br>Coat from outlet<br>Coverage: 50% | 1.0 g/in$^3$ Cu-CHA<br>Coat from inlet<br>Coverage: 100% | 0.4 g/in$^3$ Cu-CHA<br>Coat from outlet<br>Coverage: 50% |
| 6 | 1.0 g/in$^3$ Cu-CHA<br>Coat from inlet<br>Coverage: 100% | 2.5 g/ft$^3$ Pt<br>Coat from outlet<br>Coverage: 67% | 0.4 g/in$^3$ Cu-CHA<br>Coat from outlet<br>Coverage: 33% |
| 7 | 1.0 g/in$^3$ Cu-CHA<br>Coat from inlet<br>Coverage: 67% | 2.5 g/ft$^3$ Pt<br>Coat from outlet<br>Coverage: 67% | 1.0 g/in$^3$ Cu-CHA<br>Coat from outlet<br>Coverage: 33% |

Sample Preparation for Samples 1 to 7:

For a first SCR catalyst coating, Cu-CHA was dispersed in water with 1% Cu acetate and 5% Zr acetate. The slurry was milled until 90% of the particles had a size less than 5 µm, and the slurry content was adjusted to 23% solids. The slurry was washcoated onto the filter substrate by immersing the substrate into the slurry with the inlet end of the substrate down into and the outlet end just above (about ¼ inch) the slurry level. The substrate was pulled out of the slurry, and a stream of air was blown from the outlet side of the channels until no washcoat slurry was coming out from the inlet side. The coated sample was then dried at 110° C. for 2 hours and calcined in air at 450° C. for 1 hour.

For Pt coating, a pre-milled $SiO_2/Al_2O_3$ powder (wherein 90% of the particles are less than 5 µm) was suspended in water to provide a slurry with about 40% solids. A calculated amount of platinum ammine solution (to achieve the desired final Pt content) was added into the suspension drop-wise while stirring. The resulting slurry was further diluted with water to achieve about 5% solids by weight. The Pt slurry was coated from the outlet end by immersing the filter substrate outlet into the slurry at a pre-marked position so that the coating coverage reached to a pre-determined level. The substrate was pulled out of the slurry, and a stream of air was blown from the inlet side of the channels until no washcoat slurry was coming out from the outlet side. The coated sample was then dried at 110° C. for 2 hours and calcined in air at 450° C. for 1 hour.

For some samples, a coated filter was further coated with a supplemental Cu-CHA slurry from the outlet end with a precalculated solid content and a predetermined coverage.

Performance of Samples 1 to 7:

For Samples 1 to 7 of Examples 1 to 7, the evaluation was conducted with a laboratory reactor which is capable of flowing 150 liter of gas per minute. The sample was housed in the center of a heated sample holder. The targeted temperature of the CSF inlet was achieved partially from the preheated gas via a preheater and partially by the heated sample holder itself. The SCR reaction and CO oxidation were evaluated separately. The SCR feed consists of 500 ppm NO, 550 ppm $NH_3$, 10% $O_2$, 5% $H_2O$, 5% $CO_2$ and balance $N_2$. The gas hourly space velocity (GHSV) was 60,000/h. The temperature was ramped from 200 to 500° C. at a ramp rate of 2.5° C./min. The CO oxidation reaction was performed at 600° C. with a feed consisting of 500 ppm CO, 10% $O_2$, 5% $H_2O$, 5% $CO_2$ and balance $N_2$ at a GHSV=60000 h$^{-1}$. Before performance evaluation, each catalyzed filter was thermally aged at 800° C. for 16 hours with a feed consisting of 10% $O_2$, 10% $H_2O$ and 80% $N_2$.

Table 2A shows the $NO_x$ conversion for Samples 1 to 7. At lower temperatures (200-300° C.), all 2-coat and 3-coat samples have higher $NO_x$ conversions compared to the SCR reference (Sample 1). At 500° C., some samples show higher or comparable $NO_x$ conversion (Samples 3 and 5), but others show lower $NO_x$ conversions (Sample 2, 4, 6, and 7). Table 2B compares the $NH_3$ conversions for Samples 1 to 7. All samples (Samples 2 to 7) show comparable or higher $NH_3$ conversions than the reference (Sample 1), especially at higher temperatures. Table 2C shows the peak $N_2O$ formation during the SCR test and CO conversion at 600° C. for Samples 1 to 7. Except for Sample 6, which has a significantly higher $N_2O$ formation than the reference, the $N_2O$ formation on all other samples is either comparable or slightly higher than the reference (Sample 1). The CO conversions at 600° C. for Samples 2 to 7, however, are about 2 to 3 times that for the reference.

TABLE 2A $NO_x$ Conversion (%) for Samples 1 to 7

| Sample ID | 200° C. | 300° C. | 400° C. | 500° C. |
|---|---|---|---|---|
| 1 | 24 | 83 | 84 | 80 |
| 2 | 26 | 87 | 85 | 78 |
| 3 | 25 | 86 | 87 | 83 |
| 4 | 26 | 86 | 83 | 73 |
| 5 | 31 | 89 | 89 | 80 |
| 6 | 29 | 83 | 81 | 72 |
| 7 | 29 | 88 | 85 | 77 |

TABLE 2B $NH_3$ Conversion (%) for Samples 1 to 7

| Sample ID | 200° C. | 300° C. | 400° C. | 500° C. |
|---|---|---|---|---|
| 1 | 20 | 72 | 77 | 85 |
| 2 | 22 | 77 | 85 | 94 |
| 3 | 20 | 75 | 82 | 91 |
| 4 | 21 | 77 | 88 | 95 |
| 5 | 26 | 79 | 85 | 95 |
| 6 | 22 | 79 | 85 | 93 |
| 7 | 23 | 79 | 85 | 94 |

TABLE 2C

Peak $N_2O$ Formation and CO Conversion at 600° C. Samples 1 to 7

| Sample ID | Peak $N_2O$ formation (ppm) | $N_2O$ peak temperature (° C.) | CO conversion at 600° C. (%) |
|---|---|---|---|
| 1 | 10 | 297 | 12 |
| 2 | 13 | 346 | 22 |
| 3 | 11 | 283 | 19 |
| 4 | 15 | 348 | 24 |
| 5 | 13 | 271 | 25 |
| 6 | 27 | 261 | 34 |
| 7 | 16 | 263 | 33 |

Sample Preparation for Samples 8 to 11:

Non-limiting Examples 8 to 11 are summarized in Table 3. All these examples are 3-coat examples with the same catalyst slurries. These Examples can be considered as variations of Example 7, wherein the variation derives from the individual coating length of each catalyst coating on the substrate.

Table 4 is an analysis of the resulting zoning of Samples 7 to 11. By changing the coating coverage, either 3 or 4 zoned catalyzed filters can be created due to changes in the overlap of the coatings. The materials, slurry preparation and coating methodology are the same as for Samples 1 to 7. After each coating, the filter was dried at 110° C. for 2 hours and then calcined at 450° C. for 1 hour.

TABLE 3

Catalyzed Filter Design for Samples 8 to 11

| Sample ID | First coat | Second coat | Third coat |
|---|---|---|---|
| 8 | 1.0 g/in$^3$ Cu-CHA Coat from inlet Coverage: 67% | 2.5 g/ft$^3$ Pt Coat from outlet Coverage: 67% | 1.0 g/in$^3$ Cu-CHA Coat from outlet Coverage: 40% |
| 9 | 1.0 g/in$^3$ Cu-CHA Coat from inlet Coverage: 60% | 2.5 g/ft$^3$ Pt Coat from outlet Coverage: 60% | 1.0 g/in$^3$ Cu-CHA Coat from outlet Coverage: 46% |
| 10 | 1.0 g/in$^3$ Cu-CHA Coat from inlet Coverage: 67% | 2.5 g/ft$^3$ Pt Coat from outlet Coverage: 67% | 1.0 g/in$^3$ Cu-CHA Coat from outlet Coverage: 67% |
| 11 | 1.0 g/in$^3$ Cu-CHA Coat from inlet Coverage: 60% | 2.5 g/ft$^3$ Pt Coat from outlet Coverage: 40% | 1.0 g/in$^3$ Cu-CHA Coat from outlet Coverage: 60% |

TABLE 4

Zoning Analysis for Sample 7 to 11

| Sample ID | Zone 1 | Zone 2 | Zone 3 | Zone 4 |
|---|---|---|---|---|
| 7 | SCR1 Length: 33% | Surface Pt SCR1 Length: 33% | Bottom Pt SCR2 Length: 33% | |
| 8 | SCR1 Length: 33% | Surface Pt SCR1 Length: 27% | Sandwiched Pt SCR2 Length: 7% | Bottom Pt SCR2 Length: 33% |
| 9 | SCR1 Length: 40% | Surface Pt SCR1 Length: 14% | Sandwiched Pt SCR2 Length: 6% | Bottom Pt SCR2 Length: 40% |
| 10 | SCR1 Length: 33% | Sandwiched Pt SCR1 Length: 33% | Bottom Pt SCR2 Length: 33% | |
| 11 | SCR1 Length: 40% | SCR2 Length: 20% | Bottom Pt SCR2 Length: 40% | |

Performance Evaluation for Samples 7 to 11:

Table 5A summarizes the $NO_x$ conversions for Samples 7 to 11 and the SCR reference (Sample 1). Compared to the SCR reference, most of the 3-coat samples show higher $NO_x$ conversion at low temperatures but comparable or lower conversion at 500° C. There is no clear differentiation between Sample 7 and Samples 8 to 11 in $NO_x$ conversion. Table 5B shows $NH_3$ conversions during the test. All 3-coat samples are clearly more active than the SCR reference (Sample 1) for $NH_3$ conversion throughout the temperature range. Table 5C shows the peak $N_2O$ formation and the CO conversion at 600° C. for Samples 7 to 11. Samples 7 to 9 produced slightly higher $N_2O$ during the test, while Samples 10 and 11 were roughly equivalent to the SCR reference (Sample 1) in $N_2O$ formation. All 3-coat samples have much higher CO conversion as compared to the SCR reference (Sample 1), with Sample 10 being the most active (40% vs. 12%).

TABLE 5A $NO_x$ Conversion (%) for Samples 7 to 11

| Sample ID | 200° C. | 300° C. | 400° C. | 500° C. |
|---|---|---|---|---|
| 1 | 24 | 83 | 84 | 80 |
| 7 | 29 | 88 | 85 | 77 |
| 8 | 26 | 84 | 82 | 75 |
| 9 | 27 | 86 | 85 | 78 |
| 10 | 29 | 84 | 82 | 73 |
| 11 | 26 | 82 | 79 | 73 |

TABLE 5B $NH_3$ Conversion (%) for Samples 7 to 11

| Sample ID | 200° C. | 300° C. | 400° C. | 500° C. |
|---|---|---|---|---|
| 1 | 20 | 72 | 77 | 85 |
| 7 | 23 | 79 | 85 | 94 |
| 8 | 24 | 81 | 87 | 94 |
| 9 | 24 | 81 | 86 | 94 |
| 10 | 28 | 86 | 91 | 97 |
| 11 | 25 | 84 | 88 | 95 |

TABLE 5C

Peak $N_2O$ Formation and CO Conversion at 600° C. Samples 7 to 11

| Sample ID | Peak $N_2O$ formation (ppm) | $N_2O$ peak temperature (° C.) | CO conversion at 600° C. (%) |
|---|---|---|---|
| 1 | 10 | 297 | 12 |
| 7 | 16 | 263 | 33 |
| 8 | 16 | 261 | 33 |
| 9 | 15 | 252 | 32 |
| 10 | 11 | 252 | 40 |
| 11 | 11 | 252 | 28 |

Sample Preparation for Samples 12 to 16:

Non-limiting Examples 12 to 16 are summarized in Table 6. These are 2-coat samples with the first coat being a mixture of Pt and Cu-CHA coated from the outlet end with a variable coverage and the second coat being Cu-CHA coated from the inlet end with full (100%) coverage. The Pt/support powder was made by impregnating a silica/alumina powder (5% $SiO_2$) with platinum ammine solution using the incipient wetness technique. The powder was dried at 110° C. overnight then calcined at 500° C. for 2 hours. The resulting powder has a Pt metal composition of 2.81% by weight. The calcined Pt powder was then suspended in water to reach about 40% solid content and milled using a continuous mill to obtain 90% of the particles less than 5 μm in size. The milled Pt slurry was then mixed with the milled Cu-CHA slurry with a design ratio. The local Pt loading in a coated filter was 5 g/ft$^3$ and 2.5 g/ft$^3$ or 0.1 g/in$^3$ and 0.05 g/in$^3$Pt/powder, respectively. Two reference samples (Samples 15 and 16) were made without the Pt (support+zeolite) for the first coat. Drying (110° C. for 1 hour) and calcination (450° C. for 2 hours) steps were conducted after each coating was applied.

TABLE 6

Catalyzed Filter Design for Samples 12-16

| | First coat design | | | | Second coat design | | |
|---|---|---|---|---|---|---|---|
| Sample ID | Pt/Support (g/in$^3$) | Cu-CHA (g/in$^3$) | Coating direction | Coating Coverage (%) | Cu-CHA (g/in$^3$) | Coating direction | Coating Coverage (%) |
| 12 | 0.1 | 0.5 | Outlet | 33 | 0.1 | Inlet | 100 |
| 13 | 0.05 | 0.55 | Outlet | 50 | 0.1 | Inlet | 100 |
| 14 | 0.1 | 0.5 | Outlet | 33 | 0.1 | Inlet | 100 |
| 15 | 0.1 w/o Pt | 0.5 | Outlet | 33 | 0.1 | Inlet | 100 |
| 16 | 0.1 w/o Pt | 0.5 | Outlet | 50 | 0.1 | Inlet | 100 |

Performance Evaluation for Samples 12 to 16:

Table 7A shows the $NO_x$ conversion for Samples 12 to 16 and the SCR reference (Sample 1). Samples 12 and 13 show slightly higher $NO_x$ conversions than the 1-coat, SCR reference throughout the temperature range, but slightly lower conversion compared to the 2-coat, Pt-free reference. Sample 14 has a slightly lower $NO_x$ conversion at 500° C. than the 1-coat SCR reference. Table 7B shows the $NH_3$ conversions for Samples 12 to 16. All 2-coat samples are more active in $NH_3$ conversion than the SCR reference (Sample 1), with Sample 12 being the most active. Table 7C shows the peak $N_2O$ formation and CO conversion at 600° C. for Samples 12 to 16. The peak $N_2O$ formations for all samples are comparable to the reference (Sample 1). Sample 14 shows the highest CO conversion (46%) followed by Sample 12 (28%).

TABLE 7A $NO_x$ Conversion (%) for Samples 12 to 16

| Sample ID | 200° C. | 300° C. | 400° C. | 500° C. |
|---|---|---|---|---|
| 1 | 24 | 83 | 84 | 80 |
| 12 | 27 | 90 | 88 | 81 |
| 13 | 27 | 87 | 87 | 83 |
| 14 | 25 | 84 | 82 | 75 |
| 15 | 28 | 88 | 90 | 85 |
| 16 | 27 | 88 | 90 | 85 |

TABLE 7B $NH_3$ Conversion (%) for Samples 12 to 16

| Sample ID | 200° C. | 300° C. | 400° C. | 500° C. |
|---|---|---|---|---|
| 1 | 20 | 72 | 78 | 85 |
| 12 | 23 | 79 | 89 | 95 |
| 13 | 22 | 77 | 83 | 91 |
| 14 | 22 | 74 | 81 | 90 |
| 15 | 23 | 78 | 85 | 92 |
| 16 | 22 | 76 | 83 | 91 |

TABLE 7C

Peak $N_2O$ Formation and CO Conversion at 600° C. Samples 12 to 16

| Sample ID | Peak $N_2O$ formation (ppm) | $N_2O$ peak temperature (° C.) | CO conversion at 600° C. (%) |
|---|---|---|---|
| 1 | 10 | 297 | 12 |
| 12 | 10 | 280 | 28 |
| 13 | 10 | 285 | 17 |
| 14 | 10 | 284 | 46 |
| 15 | 10 | 282 | 17 |
| 16 | 9 | 294 | 16 |

Sample Preparation for Samples 17 to 22:

Non-limiting Examples 17 to 22 are summarized in Table 8. This matrix of examples involves "face painting" of catalytic materials. Unlike washcoating, where catalyst materials penetrate into the porous media of the filter, face painting applies catalyst only on the face (or exposed edge) of the filter by painting catalyst paste with a brush or a roller. Therefore, the catalyst materials are not expected to penetrate the filter beyond the filter plugs. For Examples 18, 20 and 22, the Pd face painting slurry was made by first impregnating an $Al_2O_3$ support with Pd nitrate solution to reach a Pd loading of 5.5% by weight; the Pd/$Al_2O_3$ powder was then suspended in water with the addition of 5% alumina binder and 2.5% Zr acetate. The final slurry has a solid content of 9%. The Pd loading for the face painting shown in Table 8 is based on the entire filter volume. However, the catalyst loadings for other coatings are based on the applied zone (local loading). Drying (110° C. for 1 hour) and calcination (450° C. for 2 h) were applied after each coating, including the face painting.

TABLE 8

Catalyzed Filter Design for Samples 17 to 22

| | First coat design (Inlet coating) | | Second coat design (Outlet coating) | | Face painting (Outlet face) |
|---|---|---|---|---|---|
| Sample ID | Cu-CHA (g/in$^3$) | Coverage (%) | Pd loading (g/ft$^3$) | Coverage (%) | Pd loading (g/ft$^3$) |
| 17 | 1.0 | 100 | | | |
| 18 | 1.0 | 100 | | | 3 |
| 19 | 1.0 | 100 | 10 | 33 | |
| 20 | 1.0 | 100 | 10 | 33 | 1 |
| 21 | 1.0 | 100 | 10 | 17 | |
| 22 | 1.0 | 100 | 10 | 17 | 0.2 |

Performance Evaluation for Samples 17 to 22:

Samples 17 to 22 of Examples 17 to 22 were evaluated with a different feed, which consists of 500 ppm NO, 550 ppm $NH_3$, 500 ppm CO, 10% $O_2$, 5% $H_2O$, 5% $CO_2$ and balance $N_2$. Since the feed contained CO, no separate CO test was performed. Table 9A summarizes the $NO_x$ conversions for Samples 17 to 22. Sample 17 is the SCR reference and has the same composition as Sample 1. Samples 18 and 21 show comparable or slightly higher NO$_x$ conversions at all temperatures as compared to the SCR reference (Sample 17). Other samples show slightly lower NO$_x$ conversions at 500° C. Table 9B compares the NH$_3$ conversions of Samples 17 to 22. All samples show substantially higher NH$_3$ conversion as compared to the SCR reference (Sample 17) with Sample 20 being the most active. Table 9C shows the peak N$_2$O formation and the CO conversion at 500° C. for Samples 17 to 22. The peak N$_2$O formations for all the samples are comparable to that of the SCR reference (6-8 ppm). The CO conversion of the SCR reference is near zero at 500° C., whereas Samples 19, 20 and 22 are much more active (49-76%) for CO conversion.

TABLE 9A

NO$_x$ Conversion (%) for Samples 17 to 22

| Sample ID | 200° C. | 300° C. | 400° C. | 500° C. |
|---|---|---|---|---|
| 17 | 20 | 81 | 84 | 83 |
| 18 | 23 | 85 | 87 | 85 |
| 19 | 22 | 82 | 84 | 77 |
| 20 | 22 | 84 | 83 | 73 |
| 21 | 23 | 86 | 87 | 83 |
| 22 | 19 | 81 | 83 | 75 |

TABLE 9B

NH$_3$ Conversion (%) for Samples 17 to 22

| Sample ID | 200° C. | 300° C. | 400° C. | 500° C. |
|---|---|---|---|---|
| 17 | 15 | 61 | 67 | 77 |
| 18 | 17 | 65 | 72 | 81 |
| 19 | 17 | 63 | 74 | 87 |
| 20 | 17 | 64 | 79 | 93 |
| 21 | 16 | 65 | 72 | 84 |
| 22 | 15 | 61 | 72 | 87 |

TABLE 9C

Peak N$_2$O Formation and CO Conversion at 500° C. Samples 17 to 22

| Sample ID | Peak N$_2$O formation (ppm) | N$_2$O peak temperature (° C.) | CO conversion at 500° C. (%) |
|---|---|---|---|
| 17 | 7 | 304 | 2 |
| 18 | 7 | 305 | 8 |
| 19 | 6 | 300 | 49 |
| 20 | 8 | 296 | 76 |
| 21 | 8 | 297 | 8 |
| 22 | 8 | 299 | 49 |

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A catalyzed particulate filter comprising:
    a plurality of porous walls extending longitudinally to form a plurality of parallel passages extending from an inlet end to an outlet end, wherein a quantity of the passages are inlet passages that are open at the inlet end and closed at the outlet end, and a quantity of passages are outlet passages that are closed at the inlet end and open at the outlet end;
    a first coating permeating through at least a portion of the porous walls of the particulate filter, wherein the length of porous wall permeated with the first coating is in the range of about 1% to about 80% of the wall length extending from the outlet end of the passages, and wherein the first coating is an oxidation catalyst comprising a platinum group metal;
    a second coating permeating through at least a portion of the porous walls of the particulate filter, wherein the length of porous wall permeated with the second coating is in the range of about 50% to about 100% of the wall length extending from the inlet end of the passages, and wherein the second coating comprises a first selective catalytic reduction catalyst; and
    a third coating that permeates through a portion of the porous walls of the particulate filter in the range of about 20% to about 80% of the wall length from the outlet end; wherein the third coating comprises a second selective reduction catalyst;
    wherein the length of the porous walls permeated only with the second coating forms a first catalytic zone of a first SCR catalyst, the length of the porous walls permeated with the second coating and the first coating forms a second catalytic zone of the first SCR catalyst and an AMOx catalyst, and the length of the porous walls permeated with both the first coating and third coating forms a third catalytic zone of a second SCR catalyst and an AMOx catalyst.

2. The catalyzed particulate filter of claim 1, wherein the first selective catalytic reduction catalyst is a zeolitic framework material promoted with a metal selected from Cu, Fe, Co, Ni, La, Ce, Mn, V, Ag, and combinations thereof.

3. The catalyzed particulate filter of claim 1, wherein the second coating permeates the porous walls of the particulate filter over 90-100% the entire length of the porous walls of the particulate filter, and the first coating is intermingled with the second coating over about 1% to about 80% of the wall length extending from the outlet end of the passages.

4. The catalyzed particulate filter of claim 3, wherein the first selective catalytic reduction catalyst comprises a molecular sieve promoted with a base metal, and wherein the length of the porous walls permeated only with the second coating forms a first catalytic zone, and the length of the porous walls permeated with both the first coating and second coating forms a second catalytic zone, wherein the oxidation catalyst intermingles with the first selective catalytic reduction catalyst in the second catalytic zone.

5. The catalyzed particulate filter of claim 4, wherein the platinum group metal loading in the second catalytic zone is in the range of about 0.1 g/ft$^3$ to about 50 g/ft$^3$.

6. The catalyzed particulate filter of claim 1, wherein the length of porous wall permeated with the second coating is in the range of about 50% to about 80% of the wall length extending from the inlet end of the passages;
    wherein the length of porous wall that is permeated with the first coating but not permeated with the second coating is in the range of about 20% to about 50% of the wall length extending from the outlet end of the passages; and
    wherein the length of porous wall permeated with the second coating and having an overlapping first coating is in the range of about 5% to about 60% of the wall length, where the first coating is coated onto the surface of an overlapping portion wherein the porous wall is permeated with the second coating.

7. The catalyzed particulate filter of claim 1, wherein the length of porous wall permeated with the second coating is in the range of about 95% to about 100% of the wall length extending from the inlet end of the passages;
   wherein the length of porous wall that is permeated with the first coating but not permeated with the second coating is in the range of about 0% to about 5% of the wall length extending from the outlet end of the passages; and
   wherein the length of porous wall permeated with the second coating and having an overlapping first coating is in the range of about 5% to about 75% of the wall length, where the first coating is coated onto the surface of an overlapping portion wherein the porous wall is permeated with the second coating.

8. The catalyzed particulate filter of claim 7, wherein the length of the porous wall coated on the surface with the first coating and the third coating is about the same.

9. The catalyzed particulate filter of claim 7, which further comprises a plug coating on the outlet side of the closed outlet end of the inlet passages, wherein the plug coating comprises a platinum group metal.

10. The catalyzed particulate filter of claim 1,
    wherein the porosity of the porous walls is in the range of about 40% to about 75%, and the mean pore size of the porous walls is in the range of about 10 μm to about 30 μm;
    and the first selective catalytic reduction catalyst comprises a copper or iron promoted CHA structure type molecular sieve.

11. The catalyzed particulate filter of claim 1, wherein the third coating comprises a copper or iron promoted CHA structure type molecular sieve.

12. The catalyzed particulate filter of claim 1, wherein the length of porous wall permeated with the second coating is in the range of about 95% to about 100% of the wall length extending from the inlet end of the passages, the length of porous wall coated on the surface with the first coating is in the range of about 5% to about 50% of the wall length, and the third coating permeated through the portion of the porous walls of the particulate filter not permeated with the second coating and coated onto the surface of the porous wall in the range of about 1% to about 70% of the wall length, wherein at least a portion of the first coating on the surface of the porous wall is sandwiched between the second coating and a portion of the third coating.

13. A method of manufacturing a coated particulate filter, comprising:
    introducing an oxidation catalyst comprising a plurality of particles into an outlet end of a plurality of parallel passages formed by a plurality of porous walls closed by a plug on an inlet end opposite the outlet end, wherein the particles of the oxidation catalyst permeates through at least a portion of the porous walls and wherein the length of porous wall permeated with the oxidation catalyst is in the range of about 1% to about 80% of the wall length extending from the outlet end of the passages; and
    introducing a first selective catalytic reduction catalyst comprising a plurality of particles into an inlet end of a plurality of parallel passages formed by a plurality of porous walls closed by a plug on an outlet side opposite the inlet side, wherein the particles of the first selective catalytic reduction catalyst permeates through the porous walls, and wherein the length of porous wall permeated with the particles of the first selective catalytic reduction catalyst is in the range of about 50% to about 100% of the wall extending from the inlet end of the passages,
    wherein the first selective catalytic reduction catalyst is introduced into the inlet end of the plurality of parallel passages before the oxidation catalyst is introduced into the outlet end of the plurality of parallel passages, and the length of porous wall permeated with the first selective catalytic reduction catalyst is in the range of about 50% to about 80% of the wall length extending from the inlet end of the passages, the length of porous wall that is not permeated with the first selective catalytic reduction catalyst, but permeated with the oxidative catalyst, is in the range of about 20% to about 50% of the wall length extending from the outlet end of the passages, and the length of porous wall permeated with the first selective catalytic reduction catalyst and having an overlapping oxidation catalyst is in the range of about 5% to about 50% of the wall length, wherein the oxidation catalyst remains essentially on the surface of the overlapping portion of the porous wall without interspersing with the first selective catalytic reduction catalyst throughout the porous wall,
    which further comprises introducing a second selective catalytic reduction catalyst comprising a plurality of particles comprising a copper or iron promoted CHA structure type molecular sieve into the outlet end of the plurality of parallel passages, wherein the second selective catalytic reduction catalyst permeates through the portion of the porous walls of the particulate filter not previously permeated with the first selective catalytic reduction catalyst, and wherein the first selective catalytic reduction catalysts comprises a copper or iron promoted CHA structure type molecular sieve.

14. The method of claim 13, wherein the porosity of the porous walls is in the range of about 40% to about 70%, and the mean pore size of the porous walls is in the range of about 10 μm to about 30 μm;
    wherein the oxidation catalyst further comprises at least one platinum group metal on the plurality of particles, and the plurality of particles of the oxidation catalyst have a composition of alumina, titania, zirconia, silica, silica/alumina, or a combination thereof; and
    wherein the first selective catalytic reduction catalyst is a molecular sieve promoted with a metal selected from Cu, Fe, Co, Ni, La, V, Mo, W, Mn, Ce, Ag and combinations thereof.

15. The method of claim 13, wherein the length of porous wall permeated with the particles of the first selective catalytic reduction catalyst is in the range of about 95% to about 100% of the wall length extending from the inlet end of the passages, the length of porous wall coated on the surface with the particles of the oxidation catalyst is in the range of about 1% to about 80% of the wall length extending from the outlet end of the passages, and the second selective catalytic reduction catalyst is coated onto the porous walls in the range of about 1% to about 80% of the wall length extending from the outlet end of the passages, wherein the second selective catalytic reduction catalyst is coated onto the surfaces of the porous walls where the second selective catalytic reduction catalyst overlaps with the first selective catalytic reduction catalyst.

16. The method of claim 13, which further comprises coating a platinum group metal onto the filter such that it only covers the plug at the end of the outlet passages.

17. The method of claim 14, which further comprises:
impregnating the platinum group metal into the plurality of the alumina, titania, zirconia, silica, silica/alumina, or a combination thereof particles by an incipient wetness technique followed by thermally treating the impregnated particles at a temperature of about 400° C. to about 600° C.,
wherein the loading of platinum group metal onto the length of porous wall permeated with the oxidation catalyst is in the range of about 0.1 g/ft$^3$ to about 50 g/ft$^3$.

18. The method of claim 17, wherein a copper or iron promoted CHA structure type molecular sieve is mixed with the plurality of platinum group metal impregnated particles to form a slurry, and the length of porous wall permeated with the slurry is in the range of about 10% to about 50% of the wall length extending from the outlet end of the passages.

\* \* \* \* \*